United States Patent
Boghossian et al.

(10) Patent No.: US 11,807,707 B2
(45) Date of Patent: Nov. 7, 2023

(54) POLYURETHANE PREPOLYMERS INCORPORATING NONLINEAR SHORT CHAIN DIOLS AND/OR SOFT DIISOCYANATES COMPOSITIONS, AND USES THEREOF

(71) Applicant: PRC-DeSoto International, Inc., Sylmar, CA (US)

(72) Inventors: Razmik Boghossian, Sylmar, CA (US); James Smith, Glendale, CA (US)

(73) Assignee: PRC-DESOTO INTERNATIONAL, INC., Slymar, CA (US)

( * ) Notice: Subject to any disclaimer, the term of this patent is extended or adjusted under 35 U.S.C. 154(b) by 0 days.

(21) Appl. No.: 17/499,042

(22) Filed: Oct. 12, 2021

(65) Prior Publication Data
US 2022/0025098 A1  Jan. 27, 2022

Related U.S. Application Data

(63) Continuation of application No. 15/384,346, filed on Dec. 20, 2016, now Pat. No. 11,180,604.

(51) Int. Cl.
| | |
|---|---|
| *C08G 18/10* | (2006.01) |
| *C08G 18/48* | (2006.01) |
| *C08G 18/44* | (2006.01) |
| *C08G 18/32* | (2006.01) |
| *C08G 18/42* | (2006.01) |
| *C08G 18/76* | (2006.01) |
| *C09D 175/02* | (2006.01) |
| *C08G 18/66* | (2006.01) |
| *C08G 18/75* | (2006.01) |
| *C08G 18/12* | (2006.01) |

(52) U.S. Cl.
CPC ......... *C08G 18/3206* (2013.01); *C08G 18/10* (2013.01); *C08G 18/12* (2013.01); *C08G 18/3212* (2013.01); *C08G 18/42* (2013.01); *C08G 18/44* (2013.01); *C08G 18/4825* (2013.01); *C08G 18/4854* (2013.01); *C08G 18/664* (2013.01); *C08G 18/6674* (2013.01); *C08G 18/758* (2013.01); *C08G 18/7671* (2013.01); *C09D 175/02* (2013.01)

(58) Field of Classification Search
CPC .......... C08G 18/10; C08G 18/3206; C08G 18/3212; C08G 18/44; C08G 18/4825; C08G 18/4854; C08G 18/664; C08G 18/6674; C08G 18/758; C08G 18/7671
See application file for complete search history.

(56) References Cited

U.S. PATENT DOCUMENTS

| | | | |
|---|---|---|---|
| 4,532,316 A | 7/1985 | Henn | |
| 5,270,364 A | 12/1993 | Schwartz et al. | |
| 5,284,888 A | 2/1994 | Morgan | |
| 5,786,070 A | 7/1998 | Higuchi et al. | |
| 6,160,076 A | 12/2000 | Reisch et al. | |
| 6,262,296 B1 * | 7/2001 | Nomura ............... | C08G 18/757 560/162 |
| 6,525,168 B2 | 2/2003 | Zook et al. | |
| 8,933,166 B2 | 1/2015 | Rukavina et al. | |
| 2005/0164008 A1 | 7/2005 | Rukavina | |
| 2010/0041839 A1 | 2/2010 | Anderson et al. | |
| 2010/0222540 A1 | 9/2010 | Raukamp et al. | |
| 2011/0189591 A1 | 8/2011 | Weiser et al. | |
| 2014/0154513 A1 | 6/2014 | Boghossian et al. | |
| 2015/0132580 A1 | 5/2015 | Boghossian et al. | |
| 2016/0039968 A1 | 2/2016 | Rukavina | |
| 2016/0257819 A1 | 9/2016 | Pathak et al. | |

FOREIGN PATENT DOCUMENTS

| | | |
|---|---|---|
| CA | 2922235 | 3/2015 |
| CA | 2969764 | 6/2016 |
| CA | 3000774 | 4/2017 |
| EP | 0781792 | 7/1997 |
| JP | H09-235343 A | 9/1997 |
| JP | 2016-519696 A | 7/2016 |
| WO | 1999/050337 A1 | 10/1999 |

OTHER PUBLICATIONS

Posey et al., "New Secondary Amine Chain Extenders for Aliphatic Polyurea Materials", Prepared for presenting at the Polyurea Development Association 2003 Annual Conference, John Ascuaga's Nugget Casino Resort, Reno, NV Aug. 19-21, 2003, 11 pages.

Yildirim et al., "The role of diisocyanate and soft segment on the intersegmental interactions in urethane and urea based segmented copolymers: A DFT study", Computational and Theoretical Chemistry, 2014, vol. 1035, p. 28-38.

* cited by examiner

*Primary Examiner* — Michael L Leonard
(74) *Attorney, Agent, or Firm* — Alicia M. Passerin

(57) ABSTRACT

Polyurethane prepolymers having non-linear short chain diols and/or soft diisocyanates incorporated into the backbone are used to provide cured polyurethane coatings having a high hard segment content and low haze. The polyurethane prepolymers can also be used to improve the dispersion of filler in cured polyurethane compositions having a high filler loading. Cured coatings prepared from the two-part polyurethane systems meet the requirements for aerospace applications.

27 Claims, No Drawings

POLYURETHANE PREPOLYMERS INCORPORATING NONLINEAR SHORT CHAIN DIOLS AND/OR SOFT DIISOCYANATES COMPOSITIONS, AND USES THEREOF

This application is a continuation of U.S. application Ser. No. 15/384,346 filed on Dec. 20, 2016, now allowed, which is incorporated by reference in its entirety.

FIELD

The present disclosure relates to two-component solvent-based polyurethane systems. The polyurethane prepolymers used in the systems have non-linear short chain diols and/or soft diisocyanates incorporated into the polyurethane backbone. The incorporation of non-linear short chain diols and/or soft diisocyanates into the polyurethane backbone can provide cured polyurethane coatings with a high hard segment content and low haze and can also improve the dispersion of fillers within cured compositions. Cured compositions prepared from the polyurethane systems meet the requirements of aerospace applications.

BACKGROUND

Polyurethanes are widely used to provide clear coatings and transparencies with excellent optical qualities. Polyurethanes for these applications can be prepared by reacting diisocyanates, polymeric polyols, and linear short chain diols. In these polyurethanes the combination of linear short chain diols and diisocyanates contributes to the hard segment content of the polyurethane. The polymeric polyol contributes to the soft segment content. The hard segment moieties can form hydrogen bonds to produce hard segment domains in a cured polymer network. The formation of hydrogen bonds and the formation of hard segment domains can result in a loss of rotational freedom in the polymer network. The high hard segment content can improve surface adhesion and chemical resistance of a cured polyurethane.

The clarity and transparency of a clear coat or transparency is reflected in haze measurements. Typically, haze values less than 5 are considered acceptable for clear coats and transparencies.

The NCO/OH ratio, the linear short chain diol content, and the diisocyanate weight percent (wt %) can influence the haze of a clear coat or transparency. As the hard segment content of a polyurethane is increased above 45%, the transparency, as well as the elasticity and flexibility, of the cured polyurethane can decrease to levels that are unacceptable for aerospace applications. However, in a cured polymer the higher hard segment domain can partition the soft segment domain to the surfaces of the film, which because of the polarity of the soft segment domain comprising can enhance adhesion of a polyurethane coating to substrates.

Liquid polyurethanes having a high hard segment content that exhibit low haze and acceptable physical properties are desired.

Polyurethanes having a higher hard segment content and that, when cured, exhibit low haze and high transparency that incorporate non-linear short chain diols into the polyurethane backbone are disclosed, for example, in U.S. Application Publication No. 2014/0154513 and in U.S. Application Publication No. 2015/0132580. Thiol-terminated polythioethers having pendent methyl groups suitable for use in aerospace sealant applications are disclosed, for example, in PCT International Publication No. WO 99/50337. These documents describe one-part thermoplastic polyurethane systems in which non-linear short chain diols are used to improve adhesion and haze in clear coats and transparencies.

Two-part thermoset polyurethane systems that exhibit low haze, high optical clarity, and high elongation and tensile strength are desired.

SUMMARY

According to the present invention, a polyurethane prepolymer comprises a reaction product of reactants comprising: a polymeric diol (a); and a soft diisocyanate (b), or a non-linear short chain diol (c), or a combination of (b) and (c); wherein the non-linear short chain diol comprises: (c1) a short chain branched diol; (c2) a cyclic diol; or (c3) a combination thereof.

According to the present invention, a polyurethane prepolymer comprises an isocyanate-terminated polyurethane prepolymer of Formula (3a), an isocyanate-terminated polyurethane prepolymer of Formula (3b), or a combination thereof;

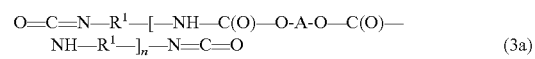

(3a)

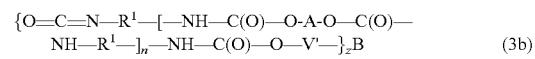

(3b)

wherein,
n is an integer from 1 to 60;
each $R^1$ comprises a divalent moiety derived from a diisocyanate;
each A independently comprises a divalent moiety derived from:
 (a) a polymeric diol;
 (c) a non-linear short chain diol, wherein the non-linear short chain diol comprises a branched short chain diol, a cyclic diol, or a combination thereof; or
 (e) a linear short chain diol;
B represents a core of a z-valent, polyfunctionalizing agent B(—V)$_z$ wherein,
 z is an integer from 3 to 6; and
 each V is a moiety comprising a terminal group reactive with an isocyanate group; and
each —V'— is derived from the reaction of —V with an isocyanate group,
wherein at least one A is derived from the non-linear short chain diol; or at least one $R^1$ is derived from a soft diisocyanate.

According to the present invention, a polyurethane prepolymer comprises an isocyanate-terminated polyurethane prepolymer of Formula (3a), an isocyanate-terminated polyurethane prepolymer of Formula (3b), or a combination thereof:

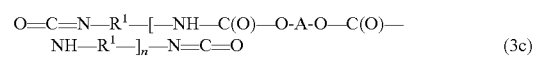

(3c)

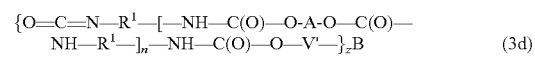

(3d)

wherein,
n is an integer from 1 to 60;
each $R^1$ comprises a divalent moiety derived from a diisocyanate;

each A independently comprises a divalent moiety derived from:
(a) polymeric diol;
(c) a non-linear short chain diol; and
(e) a linear short chain diol; and
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group,
wherein at least one A is derived from the non-linear short chain diol (c).

According to the present invention, a polyurethane prepolymer comprises an isocyanate-terminated polyurethane prepolymer of Formula (3a), an isocyanate-terminated polyurethane prepolymer of Formula (3b), or a combination thereof:

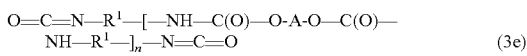

(3e)

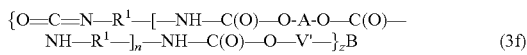

(3f)

wherein,
n is an integer from 1 to 60;
each R$^1$ independently comprises a divalent moiety derived from a soft diisocyanate or a moiety derived from a rigid diisocyanate, wherein at least one R$^1$ is derived from a soft diisocyanate;
each A independently comprises a divalent moiety derived from:
(a) polymeric diol; and
(e) a linear short chain diol; and
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group,
wherein at least one A is derived from the non-linear short chain diol (c).

According to the present invention, a composition comprises a polyurethane prepolymer according to the present invention.

According to the present invention, a coating is prepared from a composition according to the present invention.

According to the present invention, a part comprises a coating according to the present invention.

According to the present invention, a method of coating a substrate comprises: applying the composition of any one of aspects 50 to 54 to at least a portion of a surface of a substrate; and curing the applied composition to provide a coated substrate.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

Furthermore, when reference is made to a chemical group defined, for example, by a number of carbon atoms, the chemical group is intended to include all sub-ranges of carbon atoms and a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number of carbon atoms from 2 to 10.

"Diisocyanate" refers to an organic component having two isocyanate —N=C=O groups. A diisocyanate can include aliphatic diisocyanates, alicyclic diisocyanates, and aromatic diisocyanates. A diisocyanate can have a molecular weight, for example less than 1,500 Daltons, less than 1,250 Daltons, less than 1,000 Daltons, less than 750 Daltons, or less than 500 Daltons. Diisocyanates are capable of forming a covalent bond with a reactive group such as hydroxyl, thiol. or amine functional group. Diisocyanates useful in the present invention can be branched or unbranched. Use of branched diisocyanates may be desirable to increase the free volume within the cured polymer matrix to provide space for the molecules to move.

"Short chain diol" refers to a compound having two hydroxyl groups linked through an inorganic moiety. A short chain diol can include a linear short chain diol, a non-linear short chain diol, or a combination thereof. A linear short chain diol has a linking group consisting of methane-diyl groups (—CH$_2$—) or one or more of the methane-diyl groups can be substituted with a heteroatom such as —O—, —S—, or —NH—. Non-linear short chain diols include branched short chain diols and cyclic diols. In a branched short chain diol, one or more of the methane-diyl groups comprises one or two substituent groups, which can be expressed, for example, as —CH(—R$^1$)— and —C(R$^1$)$_2$—, where R$^1$ represents a substituent group. A substituent group can be a $C_{1-4}$ alkyl group such as methyl, ethyl, n-propyl, isopropyl, n-butyl, and isobutyl. A non-linear short chain diol can also include cyclic diols in which the group linking the two hydroxyl groups comprises a cyclic organic moiety. A short chain diol can have a molecular weight, for example, less than 500 Daltons, less than 400 Daltons, less than 300 Daltons, less than 200 Daltons, or less than 100 Daltons. A short chain diol including linear and non-linear short chain diols can have a molecular weight, for example, from 50 Daltons to 500 Daltons, from 50 Daltons to 400 Daltons, from 50 Daltons to 300 Daltons, or from 50 Daltons to 200 Daltons. It is believed that non-linear segments within the polyurethane backbone can increase the free volume within the cured polymer matrix, thereby providing room for the molecules to move. The molecules can orient and rotate into configurations and alignments having favorable energy states which can provide good impact properties and/or high modulus of elasticity for the cured polymer matrix.

"Polymeric diol" refers to a diol characterized by a molecular weight greater than that of a short chain diol. For example, a polymeric diol can be characterized by a weight average molecular weight greater than 500 Daltons, greater than 1,000 Daltons, greater than 2,000 Daltons, greater than 3,000 Daltons, or greater than 4,000 Daltons. Polymeric diols are liquid at room temperature such as 25° C. and 100 kPa.

"Polyol polyfunctionalizing agent" refers to a polyol having, for example, from 3 to 6 terminal hydroxyl groups. A polyol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polyol polyfunctionalizing agents can be represented by the formula $B(-V)_z$, where B represents a core of a z-valent polyfunctionalizing agent $B(-V)_z$, z is an integer from 3 to 6; and each —V is a moiety comprising a terminal group reactive with an isocyanate group, such as a hydroxyl (—OH) group. Polyurethane prepolymers provided by the present disclosure comprise hard segments and soft segments. "Hard segment" refers to the diisocyanate and short-chain diol component forming a polyurethane. The hard segment content can be expressed as wt % where the wt % hard segment content is the sum of the wt % diisocyanate and wt % short-chain diol used to form a polyurethane prepolymer, where wt % is based on the total weight of the polyurethane prepolymer. A hard segment has fewer conformational degrees of freedom than does a soft segment. Hydrogen bonding between hard segments produces hard segment domains in the polymeric network. The formation of hydrogen bonds and the extent of hard segment domains can decrease the conformational degrees of freedom. "Soft segment" refers to the polymeric diol component and polyol polyfunctionalizing agent forming a polyurethane. The soft segment content can be expressed as wt %, where the soft segment content represents the wt % polymeric diol and wt % polyol polyfunctionalizing agent used to form the polyurethane prepolymer, where wt % is based on the total weight of the polyurethane prepolymer. The relative amounts of the hard segment and soft segment of a polyurethane prepolymer can be expressed as wt % of the total weight of a polyurethane prepolymer.

"Composition" is intended to encompass a product comprising the specified ingredients in the specified amounts, as well as any product which results, directly or indirectly, from combination of the specified ingredients in the specified amounts.

"A moiety derived from reaction with an isocyanate group" refers to a moiety produced by the reaction of a parent moiety with an isocyanate group. For example, a hydroxyl-terminated parent moiety having the structure —$R^1$—OH, upon reaction with a moiety having a terminal isocyanate group —$R^2$—N═C═O, will produce the moiety —$R^1$—O—C(═O)—NH—$R^2$— and the moiety —$R^1$—O— and the moiety —$R^1$—O—C(═O)— are said to be derived from reaction with the isocyanate group.

"Derived from" as in "a moiety derived from a compound" refers to a moiety that is generated upon reaction of a parent compound with a reactant. For example, a bis (alkenyl) compound $CH_2$═CH—R—CH═$CH_2$ can react with another compound such as two compounds having thiol groups to produce the moiety —$(CH_2)_2$—R—$(CH_2)_2$— derived from the reaction.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product (s) of the recited reactants, and can include partial reaction products as well as fully reacted products.

"Prepolymer" refers to homopolymers and copolymers. A prepolymer is liquid at room temperature such as 25° C. and 100 kPa. A prepolymer comprise reactive groups capable of reacting with another compound such as a curing agent or crosslinker to form a cured polymer.

"Soft diisocyanate" refers to

"Hard diisocyanate" refers to

As used herein, the term "cure" or "cured" as used in connection with a composition, e.g., "composition when cured" or a "cured composition", means that any curable or crosslinkable components of the composition are at least partially reacted or crosslinked.

"Molecular weight" refers to either a theoretical molecular weight estimated from the chemical structure of a compound, or a weight average molecular weight determined using gel permeation chromatography using polystyrene standards.

Hard segments, i.e., the crystalline or semi-crystalline region of a polyurethane prepolymer, are derived from the diisocyanate and the short chain diol. Soft segments of the polyurethane prepolymer are derived from the polymeric diol and polyol polyfunctionalizing agent. The qualitative contribution of a particular polyol to either the hard segment or soft segment when mixed and reacted with other polyurethane-forming components can be determined by measuring the Fischer micro-hardness of the resulting cured polyurethane according to ISO 14577-1:2002.

In polyurethane prepolymers provided by the present disclosure, the hard segment content can range, for example, from 30 wt % to 80 wt %, from 30 wt % to 70 wt %, or from 30 wt % to 60 wt %; or can be greater than 30 wt %, greater than 40 wt %, greater than 50 wt %, greater than 60 wt % or greater than 70 wt %, wherein wt % is based on the total weight of the polyurethane prepolymer. The hard segment content is the percentage by weight (wt %) of the hard segment linkages present in the prepolymer and can be calculated by determining the total number of equivalents, and from this the total weight of all reactants, and dividing the total weight of the hard segment linkages obtained from these reactants by the total weight of the reactants themselves. The following example explains the calculation. For example, a polyurethane prepolymer can be prepared by reacting 0.7 equivalents of 1,4-butanediol, 0.3 equivalents of trimethylolpropane and 1 equivalent of 4,4'-methylene-bis-(cyclohexyl isocyanate) (Desmodur® W). The equivalent weight of the 1,4-butanediol is 45 g/eq., the equivalent weight of the trimethylolpropane is 44.7 g/eq. (corrected for impurities) and the equivalent weight of the Desmodur® W is 131.2 g/eq. Therefore, the weight of the components used to form the polyurethane prepolymer is 31.54 parts by weight of 1,4-butanediol, 13.2 parts by weight of trimethylolpropane, and 131.2 parts by weight of Desmodur® W or a total reactant weight of 175 parts by weight. One equivalent of 1,4-butanediol will yield one equivalent of hard segment linkage, where the hard segment linkage is 1,4-butanediol/Desmodur® W dimer. The equivalent weight of a 1,4-butanediol/Desmodur® W dimer linkage is 176 g/eq. so that the total weight of the hard segment linkages determined by multiplying the equivalent weight of the hard segment dimer by the number of equivalents of 1,4-butanediol is 123.2 g/eq. Thus, the total weight of the 1,4-butanediol/Desmodur® W dimer linkage, 123.2 g/eq., divided by the total weight of the reactants, 175.7, multiplied by 100 to convert to percentages would give a percentage by weight of hard segment linkage of 70 percent by weight (wt %).

The term "equivalent" means the mass in grams of a substance which can react with one mole ($6.022 \times 10^{23}$ atoms) of another substance. "Equivalent weight" is effectively equal to the amount of a substance in moles, divided by the valence or number of functional reactive groups of the substance.

Polyurethane prepolymers provided by the present disclosure include non-linear short chain diols incorporated into the polyurethane backbone. Polyurethane prepolymers provided by the present disclosure can include soft diisocyanates incorporated into the polyurethane backbone. Polyurethane prepolymers provided by the present disclosure include both non-linear short chain diols and soft diisocyanates incorporated into the polyurethane backbone.

Polyurethane prepolymers provided by the present disclosure can comprise the reaction product of reactants comprising a diisocyanate; a polymeric diol, and a non-linear short chain diol. A non-linear short chain diol comprises a branched short chain diol, a cyclic diol, or a combination thereof.

Polyurethane prepolymers provided by the present disclosure can comprise the reaction product of reactants comprising a soft diisocyanate; a polymeric diol, and a linear short chain diol.

Polyurethane prepolymers provided by the present disclosure can comprise the reaction product of reactants comprising a soft diisocyanate; a polymeric diol, and a non-linear short chain diol.

The polyurethane prepolymers can be liquid at room temperature such as at 25° C. and 100 kpa.

Polyurethane prepolymers provided by the present disclosure can comprise, for example, a hard segment content greater than 30 wt %, greater than 35 wt %, greater than 40 wt %, greater than 45 wt %, greater than 50 wt %, greater than 55 wt %, greater than 60 wt %, greater than 65 wt %, greater than 65 wt %, or greater than 70 wt %. Polyurethane prepolymers provided by the present disclosure can comprise a hard segment content, for example, from 30 wt % to 75 wt %, from 30 wt % to 70 wt %, or from 30 wt % to 60 wt %.

Polyurethane prepolymers can be terminated in a suitable functional group as appropriate for a particular curing chemistry. For example, polyurethane prepolymers can comprise terminal isocyanate groups, and the isocyanate-terminated polyurethane prepolymers can be reacted with a polyamine curing agent to provide cured polyurea coatings that exhibit low haze and meet the demanding performance requirements of aerospace coating applications. Polyurethane prepolymers can comprise terminal isocyanate groups, and the isocyanate-terminated polyurethane prepolymers can be reacted with a polyol curing agent to provide cured polyurethane coatings that exhibit low haze and meet the demanding performance requirements of aerospace coating applications. Polyurethane prepolymers can be terminated in other reactive groups such as hydroxyl groups, thiol groups, amine groups, epoxy groups, Michael acceptor groups, or other reactive group suitable for a particular curing chemistry. Such polyurethane prepolymers can be prepared, for example, by reacting an isocyanate terminated prepolymer provided by the present disclosure with a compound having a group reactive with isocyanate groups and a desired reactive group.

Suitable diisocyanates for preparing polyurethane prepolymers of the present disclosure can include aliphatic diisocyanates, alicyclic aliphatic diisocyanates, aromatic diisocyanates, and combinations of any of the foregoing.

A diisocyanate can comprise a rigid diisocyanate, a flexible diisocyanate, or a combination thereof. The terms rigid diisocyanate and flexible or soft diisocyanate are relative and refer to the conformational degrees of freedom of the molecule. A rigid or hard diisocyanate refers to a diisocyanate that has no or few conformational degrees of freedom. An example of a rigid diisocyanate is 4,4'-methylene dicyclohexyl diisocyanate ($H_{12}MDI$). A flexible diisocyanate has more conformational degrees of freedom than a rigid diisocyanate. An example of a flexible diisocyanate, compared to $H_{12}MDI$, is isophorone diisocyanate (IPDI). Tetramethyl xylene diisocyanate (TMXDI) is another example of a soft diisocyanate. Both flexible diisocyanates and rigid diisocyanates are included within the scope of the hard segment.

Flexible diisocyanates can be characterized by diisocyanates having a linear structure. Flexible diisocyanates generally include aliphatic diisocyanates. Examples of suitable flexible diisocyanates include 1,6-hexamethylene diisocyanate, 1,5-diisocyanato-2-methylpentane, 1,6-diisocyanato-2,2,4-trimethylhexane, 1,6-diisocyanato-2,4,4-trimethylhexane, 1,4-diisocyanatobutanone, tri-methylhexamethylene diisocyanate, 1,8-diisocyanatooctane, 1,12-diisocyanatododecane, 1,8-diiscyanto-2,4-dimethyloctane, and TMXDI. In TMXDI, the isocyanate is not bonded directly to the aromatic ring.

Flexible diisocyanates also include diisocyanates having a single aromatic or cycloaliphatic ring such as isophorone diisocyanate (IPDI), 1,3-bis(isocyanato methyl)cyclohexane, 1,4-bis(isocyanato methyl)cyclohexane, trans-1,4-cyclohexylene diisocyanate, and 2,4-diisocyanato-1-methyl cyclohexane.

A rigid diisocyanate can have a two aromatic or cycloalkane ring. Examples of rigid diisocyanates include 4,4-methylene dicyclohexyl diisocyanate, and bis(4-isocyanatocyclohexyl methane.

Suitable aliphatic diisocyanates for preparing polyurethane prepolymers provided by the present disclosure include, for example, isophorone diisocyanate (IPDI), tetramethyl xylene diisocyanate (TMXDI), 4,4'-methylene dicyclohexyl diisocyanate ($H_{12}MDI$), methylene diphenyl diisocyanate (MDI), toluene diisocyanate (TDI), 1,6-hexamethylene diisocyanate (HDI), pentane, 1,5-diisocyanato-, and a combination of any of the foregoing.

Examples of other suitable aliphatic diisocyanates include 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5 (6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indene dimethyl diisocyanate, and 1,1'-methylenebis(4-isocyanatocyclohexane).

Examples of suitable alicyclic aliphatic diisocyanates include isophorone diisocyanate (IPDI), 1,4-cyclohexyl diisocyanate (CHDI), methylcyclohexane diisocyanate, bis(isocyanatomethyl)cyclohexane, bis(isocyanatocyclohexyl) methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Other examples of suitable alicyclic diisocyanates for preparing polyurethane prepolymers provided by the present disclosure include 2,2,4-trimethylhexamethylene diisocyanate (TMDI), 1,6-hexamethylene diisocyanate (HDI), 1,1'-methylene-bis-(4-isocyanatocyclohexane), 4,4'-methylene-bis-(cyclohexyl diisocyanate) (4,4-methylene dicyclohexyl diisocyanate ($H_{12}$MDI)), hydrogenated toluene diisocyanate, 4,4'-isopropylidene-bis-(cyclohexyl isocyanate), 1,4-cyclohexyl diisocyanate (CHDI), 4,4'-dicyclohexylmethane diisocyanate (Desmodur® W), and 3-isocyanato methyl-3,5,5-trimethylcyclohexyl diisocyanate (IPDI). Mixtures and combinations of these diisocyanates can also be employed.

Compositions prepared using acyclic and alicyclic aliphatic diisocyanates may exhibit greater stability relative to compositions prepared using other diisocyanates when exposed to ultraviolet (UV) light.

Examples of suitable aromatic diisocyanates in which the isocyanate groups are not bonded directly to the aromatic ring include bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan.

Suitable aromatic diisocyanates having isocyanate groups bonded directly to the aromatic ring include, for example, phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, and a combination of any of the foregoing.

A suitable diisocyanate can have a molecular weight, for example, from 150 Daltons to 600 Daltons, from 100 Daltons to 1,000 Daltons, or from 300 Daltons to 1,000 Daltons. The reactants for preparing a polyurethane prepolymer can comprise a ratio of isocyanate functional groups to hydroxyl groups, for example, from 1.01 to 1.10, from 1.01 to 1.5, or from 1.2 to 1.6. A diisocyanate can comprise a single type of diisocyanate or can comprise a combination of different types of diisocyanates. A diisocyanate can comprise a combination of a single type of diisocyanate having diisocyanates with different molecular weights.

A polyurethane prepolymer can be prepared, for example, from a combination of aliphatic diisocyanates having different molecular structures and/or functionalities. By including more than one type of aliphatic diisocyanate, a coating prepared from a polyurethane prepolymer can have improved softness and/or flexibility. Additionally, a cured composition comprising a polyurethane prepolymer prepared from more than one aliphatic diisocyanate may exhibit a low haze value even when the composition includes a high hard segment content. A cured composition prepared from a polyurethane prepolymer including a combination of aliphatic diisocyanates can also exhibit improved adhesion, such as improved adhesion to one or more substrates. Flexible diisocyanates, such as isophorone diisocyanate and/or TMXDI, can be incorporated in combination with rigid diisocyanates, as the flexible diisocyanates can improve adhesion and lower the haze reading at higher hard segment content.

A polyurethane prepolymer provided by the present disclosure can comprise, for example, greater than 25 wt % of a diisocyanate, greater than 30 wt %, greater than 35 wt %, greater than 40 wt %, or greater than 45 wt % of a diisocyanate, where wt % is based on the total weight of the polyurethane prepolymer. A polyurethane prepolymer provided by the present disclosure can comprise from 20 wt % to 45 wt % of a diisocyanate, from 20 wt % to 40 wt %, from 20 wt % to 30 wt %, or from 25 wt % to 35 wt % of a diisocyanate, where wt % is based on the total weight of the polyurethane prepolymer.

A polyurethane prepolymer can comprise a combination of rigid and flexible diisocyanates such as a combination of $H_{12}$MDI and IPDI. The wt % ratio of rigid to flexible diisocyanate in a polyurethane prepolymer can be, for example, from 1 to 4, from 1 to 3, from 1 to 2, or from 1 to 1.5.

Suitable non-linear short chain diols can comprise moieties that reduce hydrogen bonding in the hard segment domain of the cured polymer and increase the entropy of the cured composition. Non-linear chain short chain diols can include lower molecular weight non-linear diols and can have, for example, molecular weights from 100 Daltons to 500 Daltons, from 100 Daltons to 300 Daltons, or from 100 Daltons to 200 Daltons.

Non-linear short chain diols include groups or moieties that reduce hydrogen bonding within the cured polymer network and prevent, minimize, or reduce hard segment domain formation in the cured polymer. Such moieties include pendent groups such as pendent alkyl groups and cyclic groups. These non-linear short chain diols can be distinguished from linear short chain diols such as linear diols having only —CH$_2$— groups and/or heteroatoms without branching or pendent groups.

Suitable non-linear short chain diols include branched short chain diols, cyclic diols, and a combination thereof.

A branched short chain diol can have a backbone comprising, for example, from 2 to 10 carbon atoms and from 1 to 4 pendent groups bonded to the backbone. Each of the pendent branching groups can comprise, for example, from 1 to 4 carbon atoms. A branched short chain diol can comprise a diol of Formula (1):

$$HO-(-CH(-R^1)-)_n-OH \qquad (1)$$

where n is an integer from 2 to 10, each R$^1$ is independently selected from hydrogen and C$_{1-4}$ alkyl, and at least one R$^1$ is C$_{1-4}$ alkyl.

Suitable branched short chain diols comprise at least one branching or pendent group and can have a molecular weight, for example, less than 200 Daltons, less than 300 Daltons, less than 400 Daltons, or less than 500 Daltons.

Examples of suitable branched short chain diols include branched chain alkane diols, such as propylene glycol, neopentyl glycol, 2-methyl-butanediol, 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, 2-ethyl-1,3-hexane diol, 2-butyl-2-ethyl-1,3-propanediol, 1,4-cyclohexane di-methanol, 2,4-diethyl-1,5-pentanediol, 3-methyl-1,5-pentanediol, 2-ethyl-1-methyl-1,5-pentanediol, 3-tert-butyl-1,5-pentanediol, 2-methyl-2,4-pentanediol, 2,2-diethyl-1,3-propanediol, 2,2,4-trimethyl-1,3-pentanediol, 2,2-dibutyl-1,3-propanediol, 2,2-methyl-2,3-pentanediol, 3,3-dimethyl-1,2-butanediol, 3-ethyl-1,3-pentanediol, 2-butyl-1,3-propanediol, 2-butyl-2-ethyl-1,3-propanediol, and combinations of any of the foregoing.

Examples of branched short chain diols include branched propylene glycols such as dipropylene glycol, tripropylene glycol, and 3,3-dimethoxy-1,5-pentanediol. A branched propylene glycol can have the structure H—(—O—CH(—CH$_3$)—CH$_2$—)$_n$—OH where n can be, for example, from 1 to 20.

Examples of suitable cyclic diols include, 2,2'-(cyclohexane-1,1-diyl)-diethanol, 4,4'-bicyclohexanol, 4,8-bis(hydroxymethyl)tricycle[5.2.1]decane, 2,2,4,4-tetramethyl-1,8-cyclobutanediol, cyclopentanediol, 1,4-cyclohexanediol, cyclohexanedimethanols (CHDM), such as 1,4-cyclohexane di-methanol, 1,2-cyclohexane di-methanol, and 1,3-cyclohexane di-methano; cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane, and combinations of any of the foregoing.

A polyurethane prepolymer provided by the present disclosure can comprise, for example, from 5 wt % to 30 wt % of a non-linear short chain diol, including branched short chain diols and/or cyclic diol, from 5 wt % to 25 wt %, from 5 wt % to 20 wt %, from 5 wt % to 15 wt %, or from 10 wt % to 20 wt % of a non-linear short chain diol, where wt % is based on the total weight of the polyurethane prepolymer. A polyurethane prepolymer provided by the present disclosure can comprise, for example, greater than 2 wt % of a non-linear diol, greater than 5 wt %, greater than 10 wt %, greater than 15 wt % or greater than 20 wt % of a non-linear diol, where wt % is based on the total weight of the polyurethane prepolymer.

A polymeric diol can comprise, for example, a polyester diol, a polyether diol, a polycarbonate diol, a polycaprolactone diol, a polycarbonate/polyester diol, a perfluoropolyether diol, a dimer acid-based polyester diol, a polyesteramide diol, or a combination of any of the foregoing. A polymeric diol may be selected from any of the chemical classes of polymeric polyols used in polyurethane formulations.

A polymeric diol can be characterized by a number average molecular weight, for example, from 250 Daltons to 10,000 Daltons, from 500 Daltons to 9,000 Daltons, from 1,000 Daltons to 8,000 Daltons, or from 2,000 Daltons to 6,000 Daltons. A polymeric diol can have a number average molecular weight, for example, from 1,000 Daltons to 3,000 Daltons, from 1,250 Daltons to 2,750 Daltons, from 1,500 Daltons to 2,500 Daltons, or from 1,750 Daltons, to 2,250 Daltons.

A polymeric diol can be reacted with a diisocyanate, a polymeric diol, and a non-linear short chain diol to form a polyurethane prepolymer of the present disclosure. Polymeric diols can include hydroxyl terminal groups with at least one oxycarbonyl linkage, and can include from 5 to 20 carbon atoms. Suitable polymeric diols include polyesters, polyesteramides, polycarbonates, and polycaprolactones. A polymeric diol can comprise aliphatic polycarbonate diols, having, for example a molecular weight from 500 Daltons to 2,000 Daltons or from 500 Daltons to 1,000 Daltons.

A polymeric diol can comprise a polycaprolactone diol.

Polyurethane prepolymers provided by the present disclosure can comprise, for example, from 25 wt % to 50 wt % of a polymeric diol, from 30 wt % to 50 wt %, from 35 wt % to 50 wt %, or from 40 wt % to 50 wt % of a polymeric diol, where wt % is based on the total weight of the polyurethane prepolymer.

A polymeric diol can comprise a polyether diol. Polyether diols useful in preparing polyurethane prepolymers provided by the present disclosure include those having the structure of Formula (2):

$$HO-(-(CH_2)_mO-)_n-H \qquad (2)$$

where m can be an integer from 1 to 10, and n can be an integer from 5 to 50 or from 4 to 45. Suitable polyether diols include polytetrahydrofuran (poly(tetramethylene ether) glycol or poly(tetramethylene oxide)), where m is 4 in Formula (2). Commercially available examples of polyether diols include Terathane® polyether glycols (Invista), which are blends of linear diols in which the hydroxyl groups are separated by repeating tetramethylene ether groups such as HO—(—CH$_2$—CH$_2$—CH$_2$—CH$_2$—O)$_n$µ-H where n can be, for example, an integer from 4 to 45. A Terathane® polyether glycol can be Terathane® 1000 (n averages 14), Terathane® 2000 (n averages 27), Terathane® 2900 (polytetramethylene ether glycol, PTMEG), Terathane® 650 or a combination of any of the foregoing. These polyether glycols have a molecular weight from 950 Daltons to 1,050 Daltons, from 1,900 Daltons to 2,100 Daltons, and from 625 Daltons to 675 Daltons, respectively. Other Terathane® polyether glycols may be used.

Suitable polyether glycols are also available from BASF under the tradename PolyTHF®.

A polyether diols can have a weight average molecular weight from 250 Daltons to less than 2900 Daltons. For example, a polyether diol can have a weight average molecular weight from 300 Daltons to 2,700 Daltons, from 500 Daltons to 2,500 Daltons, from 650 Daltons to 2000 Daltons, from 1,000 Daltons to 1,800 Daltons, or from 1,000 Daltons to 1,400 Daltons.

More than one type of polyether diol can be used. A polymeric diol can comprise a combination of polyether polyols having several different weight average molecular weights. A composition can comprise a mixture of polyether diols having several different glass transition temperatures. A polymeric diol can include a combination of different types of polymeric diols such as, for example, a combination of polyether diols and polyester diols.

Examples of suitable polyester diols include polyester glycols, polycaprolactone diols, polycarbonate diols and combinations thereof. Polyester glycols can include the esterification products of one or more dicarboxylic acids having from four to ten carbon atoms, such as adipic acid, succinic acid, or sebacic acid, with one or more low molecular weight glycols having from two to ten carbon atoms, such as ethylene glycol, propylene glycol, diethylene glycol, 1,4-butanediol, neopentyl glycol, 1,6-hexanediol, and 1,10-decanediol. Examples of suitable polycaprolactone diols include those prepared by condensing caprolactone in the presence of difunctional active hydrogen material such as water or low molecular weight glycols, for example ethylene glycol and propylene glycol. Examples of suitable polycaprolactone diols include commercially available materials designated as the CAPA® series from Solvay Chemical; such as CAPA® 2047A and CAPA® 2077A, and the polycaprolactone TONE® series from Dow Chemical, such as TONE® 0201, TONE® 0210, TONE® 0230, and TONE® 0241. A polycaprolactone diol can have a weight average molecular weight ranging, for example, from a 500 Daltons to 2,000 Daltons, or 500 Daltons to 1,000 Daltons. Polyester diols include those included within the Desmophen® and Baycoll® product lines available from Covestro.

Examples of suitable polycarbonate diols include aliphatic polycarbonate diols, for example those based upon alkylene glycols, ether glycols, alicyclic glycols or combinations thereof. The alkylene groups for preparing the polycarbonate diol can comprise from 5 to 10 carbon atoms and can be straight chain, cycloalkylene, or combinations thereof. Examples of such alkylene groups include hexylene, octylene, decylene, cyclohexylene and cyclohexyldimethylene. Suitable polycarbonate polyols can be prepared, for example, by reacting a hydroxy terminated alkylene glycol with a dialkyl carbonate, such as methyl, ethyl, n-propyl or n-butyl carbonate, or diaryl carbonate, such as diphenyl or dinaphthyl carbonate, or by reacting of a hydroxy-terminated alkylene diol with phosgene or bischloroformate, in a manner well-known to those skilled in the art. Examples of such polycarbonate diols include those commercially available as Ravecarb™107 from Enichem S.p.A. (Polimeri Europa), and polyhexylene carbonate diols, 1000 number average molecular weight, such as 13410-1733 polycarbonate diol prepared from hexanediol, available from Stahl. Examples of other suitable polycarbonate diols that are commercially available include KM10-1122, KM10-1667 (prepared from a 50/50 weight percent mixture of cyclohexane dimethanol and hexanediol) (commercially available from Stahl U.S.A. Inc.) and Desmophen® 2020E (Bayer Corp).

Examples of suitable polycarbonate diols also include polycarbonate-polyester diols. Suitable polymeric diols include polycarbonate diols and polycarbonate-polyester diols such as Desmophen® C available from Covestro.

Polymeric diols can include dimer acid-based polyester diols. For example, dimer acid-based diols can include Priplast™ dimer fatty acid-based polyester diols available from Croda Polymers & Coatings.

Suitable polyfluoro diols such as fluoropolyether diols and fluoropolyester diols are available from Solvay.

Polyurethane prepolymers provided by the present disclosure can also comprise, in addition to moieties derived from a non-linear short chain diol, moieties derived from a linear short chain diol, such as an aliphatic linear short chain diol or a combination of aliphatic linear short chain diols. Thus, reactants used to prepare a polyurethane prepolymer can also comprise a linear short chain diol.

A short chain linear diol such as an aliphatic linear diol can have a molecular weight, for example, less than 500 Daltons, less than 300 Daltons, less than 200 Daltons, or less than 100 Daltons. A short chain linear diol can have a molecular weight, for example, from 50 Daltons to 500 Daltons, from 50 Daltons to 400 Daltons, from 76 Daltons to 104 Daltons or from 50 Daltons to 200 Daltons.

Linear short chain diols can be used in combination with non-linear short chain diols in preparing polyurethane prepolymers provided by the present disclosure. A short chain diol can comprise a non-linear short chain diol or a combination of non-linear short chain diols and a linear short chain diol or a combination of linear short chain diols. The linear short chain diol can comprise from 5 wt % to 60 wt %, from 10 wt % to 40 wt %, or from 10 wt % to 30 wt % of a short chain diol, where wt % is based on the total weight of the short chain diol used to form a polyurethane prepolymer, which can include both a non-linear short chain diol and a linear short chain diol.

A linear short chain diol can include a linear aliphatic diol, having, for example, from 1 to 18, such as from 1 to 6 carbon atoms. Examples of suitable aliphatic linear short chain diols include ethylene glycol, propane diol, butane diol, pentane diol, hexane diol, and combinations of any of the foregoing. A linear short chain diol can have an odd number of carbon atoms, such as 1,2-propanediol and 1,5-pentanediol.

Examples of suitable short chain diols include straight chain alkane diols such as 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, and combinations of any of the foregoing. A short chain diol can comprise, for example, a propane diol such as 1,2-propanediol and 1,3-propanediol, or butane diol such as 1,2-butanediol, 1,3-butanediol, and 1,4-butanediol. One or more carbon atoms in a short chain diol can be replaced with a heteroatom, such as N, S, or O, for example diethylene glycol, triethylene glycol, tetraethylene glycol, and sulfur-containing polyols, such as thiodiethanol such as 2,2-thiodiethanol, and 3,6-dithia-1,2-octanediol.

The reactants used to prepare a polyurethane prepolymer provided by the present disclosure can further include a polyol polyfunctionalizing agent. A polyol polyfunctionalizing agent can have, for example, from 3 to 6 terminal hydroxyl groups. Suitable polyol polyfunctionalizing agents include any of those typically used in polyurethane formulations.

Examples of suitable trifunctional, tetrafunctional or higher polyols include alkane polyols, including glycerol, glycerin, tetramethylolmethane, trimethylolethane (for example 1,1,1-trimethylolethane), trimethylolpropane (TMP) (for example 1,1,1-trimethylolpropane), erythritol, pentaerythritol, dipentaerythritol, tripentaerythritol, sorbitan, alkoxylated derivatives thereof, and combinations of any of the foregoing.

A polyol can be a cycloalkane polyol, such as trimethylene bis(1,3,5-cyclohexanetriol).

A polyol can be an aromatic polyol, such as trimethylene bis(1,3,5-benzenetriol).

Examples of other suitable polyols include polyols which can be alkoxylated polyol derivatives of polyols such as alkane polyols, including ethoxylated, propoxylated and butoxylated derivatives. A polyol can be alkoxylated with from 1 to 10 alkoxy groups such as glycerol, trimethylolethane, trimethylolpropane, benzenetriol, cyclohexanetriol, erythritol, pentaerythritol, sorbitol, mannitol, sorbitan, dipentaerythritol and tripentaerythritol. A polyol can be alkoxylated, ethoxylated and propoxylated polyols and combinations thereof can be used alone or in combination with unalkoxylated, unethoxylated and unpropoxylated polyols having at least three hydroxyl groups and combinations thereof. The number of alkoxy groups can be from 1 to 10, or from 2 to 8 or any rational number between 1 and 10. An alkoxy group can be ethoxy and the number of ethoxy groups can be 1 to 5 units. A polyol can be trimethylolpropane having up to 2 ethoxy groups. Suitable alkoxylated polyols include ethoxylated trimethylolpropane, propoxylated trimethylolpropane, ethoxylated trimethylolethane, and combinations of any of the foregoing.

Polyol polyfunctionalizing agents include CAPA™ polycaprolactones such as CAPA™ 4101 and CAPA® 3031 available from Perstorp Group. CAPA™ caprolactone polyols include tri- and tetra-functional polyols having the structure HO—[—(CH$_2$)$_5$—C(=O)—O—]—H—[—O—C=O—(CH$_2$)$_5$—]$_n$—OH having a molecular weight from 300 Daltons to 8,000 Daltons.

Combinations of any of the polyols disclosed herein can be used. A polyol polyfunctionalizing agent can have from 3 to 18 carbon atoms such as from 4 to 18 carbon atoms and can have a number average molecular weight of 90 Daltons to 500 Daltons such as from 100 Daltons to 500 Daltons. A polyol can have a number average molecular weight of less than 450 Daltons. A polyol can have a number average molecular weight of less than 200 Daltons. A polyol polyfunctionalizing agent can have, for example, a molecular weight from 200 Daltons to 3,000 Daltons, from 500 Daltons to 2,500 Daltons, or from 500 Daltons to 1,500 Daltons.

For example, the reactants used to prepare a polyurethane prepolymer provided by the present disclosure may further include a triol or combination of triiols, a tetrol or combination of tetrols, a pentol or combination of pentols, a hexol or combination of hexols, or a combination of any of the foregoing. For example, the reactants may contain less than 1 wt % of a triol such as from 0.1 wt % to 0.9 wt %, wherein wt % is based on the total weight of the components forming the polyurethane prepolymer. The reactants used to prepare the polyurethane prepolymer can comprise, for example from 1 wt % to 20 wt % of a polyol polyfunctionalizing agent, from 1 wt % to 15 wt %, from 1 wt % to 10 wt %, from 1 wt % to 5 wt % of a polyol, from 0.5 wt % to 2 wt %, or from 3 wt % to 7 wt % of a polyol polyfunctionalizing agent, where wt % is pasted on the total weight of the polyurethane prepolymer. Polyurethane prepolymers provided by the present disclosure can comprise more than 0 wt % to less than 10 wt % of a polyol polyfunctionalizing agent, less than 8 wt %, less than 6 wt %, less than 4 wt %, or less than 2 wt % of a polyol polyfunctionalizing agent, where wt % is based on the total weight of the polyurethane prepolymer.

Incorporation of a small amount of a polyol polyfunctionalizing agent in the polyurethane prepolymer backbone can also lower haze values and can also increase the tensile strength of the cured polymer composition.

Polyurethane prepolymers can comprise an isocyanate-terminated polyurethane prepolymer of Formula (3a), an isocyanate-terminated polyurethane prepolymer of Formula (3b), or a combination thereof:

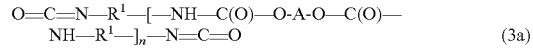

O=C=N—R$^1$—[—NH—C(O)—O-A-O—C(O)—NH—R$^1$—]$_n$—N=C=O  (3a)

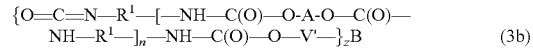

{O=C=N—R$^1$—[—NH—C(O)—O-A-O—C(O)—NH—R$^1$—]$_n$—NH—C(O)—O—V'—}$_z$B  (3b)

wherein,
n is an integer from 1 to 60;
each R$^1$ comprises a divalent moiety derived from a diisocyanate;
each A independently comprises a divalent moiety derived from a non-linear short chain diol and a divalent moiety derived from a polymeric diol; and
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group.

In polyurethane prepolymers of Formula (3a) and Formula (3b), n can be, for example, an integer from 1 to 50, from 1 to 40, from 1 to 20, from 10 to 60, or from 10 to 40.

In polyurethane prepolymers of Formula (3a) and Formula (3b), R$^1$ can comprise a divalent moiety derived from a diisocyanate as defined before such as dicyclohexylmethane-4,4'-diisocyanate (H$_{12}$MDI), isophorone diisocyanate (IPDI), or a combination thereof.

In polyurethane prepolymers of Formula (3a) and Formula (3b), A can be derived from a non-linear short chain diol as defined herein such as cyclohexane di-methanol, butylethyl propane diol, tri-methyl propane diol, or a combination of any of the foregoing.

In polyurethane prepolymers of Formula (3a) and Formula (3b), A can be derived from a polymeric diol as defined herein such as a polyether polyol.

In polyurethane prepolymers of Formula (3a) and Formula (3b) the hard segment content, i.e., the wt % of the diisocyanate and short chain diol can be at least 30 wt %, at least 50 wt %, at least 60 wt %, or at least 70 wt %, where wt % is based on the total weight of the polyurethane prepolymer.

In polyurethane prepolymers of Formula (3a) and Formula (3b), A can be derived from a non-linear short chain diol, wherein the non-linear short chain diol can comprise a branched short chain diol of Formula (1):

HO—(—CH(—R$^1$)—)$_n$—OH  (1)

wherein,
n is an integer from 2 to 10;
each R$^1$ is independently selected from hydrogen and C$_{1-4}$ alkyl; and
at least one R$^1$ is C$_{1-4}$ alkyl.

In branched short chain diols of Formula (1), n can be an integer from 2 to 8, from 2 to 6, or from 2 to 4. In branched short chain diols of Formula (1), n can be 2, 3, 4, 5, 6, 7, 8, 9, or 10.

In branched short chain diols of Formula (1), each $R^1$ can be selected, for example, from methyl, ethyl, n-propyl, isopropyl, sec-butyl, and isobutyl.

In polyurethane prepolymers of Formula (3a) and Formula (3b), A can be derived from a polyether diol, wherein the polyether diol comprises a polyether diol of Formula (2):

$$HO-(-(CH_2)_m O-)_n-H \tag{2}$$

wherein, m is an integer from 1 to 10; and n is an integer from 5 to 50.

In polyether diols of Formula (2), m can be, for example, an integer from 1 to 8, from 1 to 6, or from 1 to 4. In diols of Formula (2), m can be 1, 2, 3, 4, 5, 6, 7, 8, 9, or 10.

In polyether diols of Formula (2), n can be from 5 to 50, from 5 to 40, or from 5 to 20.

In polyurethane prepolymers of Formula (3a) and Formula (3b), A can further be derived from a linear short chain diol.

In polyurethane prepolymers of Formula (3a) and Formula (3b), from 5% to 50%, from 5% to 40%, from 10% to 30%, from 10% to 20%, or from 5% to 15% of the -A- groups can be derived from a short chain diol, which can comprise a combination of a non-linear short chain diol and a linear short chain diol. Thus, -A- can be derived from a polymeric diol, a non-linear short chain diol, and a linear short chain diol. In polyurethane prepolymers of Formula (3a) and Formula (3b) at least one -A- is derived from a non-linear short chain diol.

Polyurethane prepolymers can comprise an isocyanate-terminated polyurethane prepolymer of Formula (3a), an isocyanate-terminated polyurethane prepolymer of Formula (3b), or a combination thereof:

$$O=C=N-R^1-[-NH-C(O)-O-A-O-C(O)-NH-R^1-]_n-N=C=O \tag{3c}$$

$$\{O=C=N-R^1-[-NH-C(O)-O-A-O-C(O)-NH-R^1-]_n-NH-C(O)-O-V'-\}_z B \tag{3d}$$

wherein, n is an integer from 1 to 60;

each $R^1$ comprises a divalent moiety derived from a diisocyanate;

each A independently comprises a divalent moiety derived from:
(a) polymeric diol;
(c) a non-linear short chain diol; and
(e) a linear short chain diol; and B represents a core of a z-valent, polyfunctionalizing agent $B(-V)_z$ wherein, z is an integer from 3 to 6; and each V is a moiety comprising a terminal group reactive with an isocyanate group; and each —V'— is derived from the reaction of —V with an isocyanate group, wherein at least one A is derived from the non-linear short chain diol (c).

In polyurethane prepolymers of Formula (3c) and Formula (3e), n, $R^1$, a polymeric diol, a non-linear short chain diol, a linear short chain diol, B, —V, z and —V'— can be defined as for Formula (3a) and Formula (3b).

Polyurethane prepolymers can comprise an isocyanate-terminated polyurethane prepolymer of Formula (3a), an isocyanate-terminated polyurethane prepolymer of Formula (3b), or a combination thereof:

$$O=C=N-R^1-[-NH-C(O)-O-A-O-C(O)-NH-R^1-]_n-N=C=O \tag{3e}$$

$$\{O=C=N-R^1-[-NH-C(O)-O-A-O-C(O)-NH-R^1-]_n-NH-C(O)-O-V'-\}_z B \tag{3f}$$

wherein, n is an integer from 1 to 60;

each $R^1$ independently comprises a divalent moiety derived from a soft diisocyanate or a moiety derived from a rigid diisocyanate, wherein at least one $R^1$ is derived from a soft diisocyanate;

each A independently comprises a divalent moiety derived from:
(a) polymeric diol; and
(e) a linear short chain diol; and B represents a core of a z-valent, polyfunctionalizing agent $B(-V)_z$ wherein, z is an integer from 3 to 6; and each V is a moiety comprising a terminal group reactive with an isocyanate group; and each —V'— is derived from the reaction of —V with an isocyanate group, wherein at least one A is derived from the non-linear short chain diol (c).

In polyurethane prepolymers of Formula (3e) and Formula (3f), a soft/flexible diisocyanates include 1,6-hexamethylene diisocyanate, 1,5-diisocyanato-2-methylpentane, 1,6-diisocyanato-2,2,4-trimethylhexane, 1,6-diisocyanato-2,4,4-trimethylhexane, 1,4-diisocyanatobutanone, tri-methylhexamethylene diisocyanate, 1,8-diisocyanatooctane, 1,12-diisocyanatododecane, 1,8-diiscyanto-2,4-dimethyloctane, and TMXDI. In TMXDI, the isocyanate is not bonded directly to the aromatic ring.

In polyurethane prepolymers of Formula (3e) and Formula (3f), a soft/flexible diisocyanate can comprise isophorone diisocyanate (IPDI), 1,3-bis(isocyanato methyl)cyclohexane, 1,4-bis(isocyanato methyl)cyclohexane, trans-1,4-cycloheylene diisocyanate, or 2,4-diisocyanato-1-methyl cyclohexane.

In polyurethane prepolymers of Formula (3e) and Formula (3f), a rigid diisocyanate can have a two aromatic or cycloalkane ring. Examples of rigid diisocyanates include 4,4-methylene dicyclohexyl diisocyanate, and bis(4-isocyanatocyclohexyl methane.

In polyurethane prepolymers of Formula (3e) and Formula (3f), n, a polymeric diol, a linear short chain diol, B, —V, z and —V'— can be defined as for Formula (3a) and Formula (3b).

Polyurethane prepolymers provided by the present disclosure can be prepared by reacting a diisocyanate, a polymeric diol, a short chain diol comprising a non-linear short chain diol, and an optional polyfunctionalizing agent in the presence of a suitable catalyst A catalyst can promote the reaction of isocyanate groups of a diisocyanate with the hydroxyl groups of the polymeric polyol and a short chain diol including non-linear short chain diols and linear short chain diols. A catalyst can be any catalyst suitable for catalyzing the reaction of an isocyanate with a polymeric polyol and a non-linear short chain polyol that does not result in a polyurethane prepolymer having undesirable properties such as, for example, discoloration and haze. Examples of suitable catalysts include tertiary amines, metal compound catalysts, and combinations thereof. Examples of suitable tertiary amine catalysts include triethylamine, N-methylmorpholine, triethylenediamine, pyridine, and picoline. Examples of suitable metal compound catalysts include compounds of lead, zinc, cobalt, titanate, iron, copper, and tin. For example, a metal compound catalyst can be lead 2-ethylhexoate, zinc 2-ethylhexoate, cobalt naphthenate, tetraisopropyl titanate, iron naphthenate, copper naphthenate, dibutyl tin diacetate, dibutyl tin dioctate, and dibutyl tin dilaurate. A catalyst can be included in an amount effective to promote the reaction of isocyanate groups of the isocyanate with the hydroxyl groups of the polyether polyol and short chain diol. For example, a catalyst can be included in an amount in a range of 0.01 wt % to 0.02 wt %, from 0.01 wt % to 0.1 wt %, from 0.01 wt % to 0.05 wt %, or from 0.01 wt % to 0.02 wt %, based on the total weight of the reactants for forming the polyurethane prepolymer.

The reactants to form a polyurethane prepolymer can be heated, for example, to a temperature from 50° C. to 80° C.

The non-linear short chain diols, linear short chain diols, polymeric diols, polyol polyfunctionalizing agents, and diisocyanates, the weight percent (wt %) of the reactants, and the equivalent ratio of isocyanate to hydroxyl groups of the reactants can be selected to achieve a desired performance of a coating. When using only linear short chain diols, to achieve a haze value of 5 or less, the wt % hard segment (combination of short chain linear diol and diisocyanate in the formulation) is limited to 45 wt %, where wt % is based on the total weight of the polyurethane prepolymer. For example, a polyurethane coating comprising a polyurethane prepolymer comprising only linear short chain diols exhibits increasingly high haze values with increasing hard segment content.

However, when all or a portion of the linear short chain diol is replaced with a non-linear short chain diol such as a branched short chain diol or cyclic diol according to the present invention, the haze value can be reduced by an order of magnitude. For example, for a polyurethane prepolymer having a 35 wt % hard segment content, when the linear short chain diol comprising a combination of butane diol and ethylene glycol is replaced with a branched short chain diol such as 2,4-diethyl-1,5-pentanediol the haze can be reduced from 57 to less than 5.

Incorporation of branched short chain diols and/or cyclic diols into a polyurethane prepolymer backbone can reduce the haze, and increase the clarity and flexibility of a polyurethane coating prepared from a polyurethane prepolymer having a high hard segment content.

When a polyurethane prepolymer includes branched short chain diols and/or cyclic diols, the hard segment can be included in amounts up to 70 wt % without causing unacceptable haze and while maintaining good flexibility. Incorporating and increasing the amount of branched short chain diol and/or cyclic diols in a polyurethane prepolymer provides a cured polymer exhibiting acceptable performance at temperatures from −40° F. (−40° C.) to −20° F. (−29° C.) and good performance at higher temperatures such as from room temperature to 145° F. (63° C.). It is believed that the pendent group or groups and the cyclic moiety or moieties can interfere with hydrogen bonding between polymer chains, thereby improving the flexibility of the cured composition. For example, the pendent groups and/or cyclic groups can reduce the extent of hydrogen bonding between urethane and ester linkages between or within polymer chains.

Polyurethane prepolymers provided by the present disclosure can comprise from 40 wt % to 80 wt % of a polymeric diol, from 0.4 wt % to 20 wt % of a non-linear short chain diol, and from 20 wt % to 50 wt % of a diisocyanate, where wt % is based on the total wt % of the polyurethane prepolymer.

Polyurethane prepolymers provided by the present disclosure can comprise from 45 wt % to 75 wt % of a polymeric diol, from 0.5 to 15 wt % of a non-linear short chain diol, and from 25 wt % to 45 wt % of a diisocyanate, where wt % is based on the total wt % of the polyurethane prepolymer.

Polyurethane prepolymers provided by the present disclosure can comprise from 50 wt % to 70 wt % of a polymeric diol, from 0.5 to 20 wt % of a non-linear short chain diol, and from 30 wt % to 40 wt % of a diisocyanate, where wt % is based on the total wt % of the polyurethane prepolymer.

Polyurethane prepolymers provided by the present disclosure can comprise from 40 wt % to 80 wt % of a polymeric diol, from 0.4 to 20 wt % of a linear short chain diol, and from 20 wt % to 50 wt % of a diisocyanate, wherein the diisocyanate comprises from 40 wt % to 80 wt % of a hard diisocyanate and from 20 wt % to 60 wt % of a soft diisocyanate, where wt % is based on the total wt % of the polyurethane prepolymer.

Polyurethane prepolymers provided by the present disclosure can comprise from 40 wt % to 80 wt % of a polymeric diol, from 0.4 to 20 wt % of a linear short chain diol, and from 20 wt % to 50 wt % of a diisocyanate, where wt % is based on the total wt % of the polyurethane prepolymer, wherein the diisocyanate comprises from 50 wt % to 70 wt % of a hard diisocyanate and from 30 wt % to 50 wt % of a soft diisocyanate, where wt % is based on the total weight of the diisocyanate.

Polyurethane prepolymers provided by the present disclosure can be used to prepare sprayable coatings such as polyurethane coating and polyurea coatings. A coating composition can comprise a polyurethane prepolymer, a curing agent, fillers, and additives.

Compositions such as sprayable coatings vided by the present disclosure can comprise a curing agent, such as a polyamine curing agent. Examples of polyamine curing agents include aliphatic polyamines, cycloaliphatic polyamines, aromatic polyamines and mixtures thereof. An amine curing agent can have at least two functional groups selected from primary amine (—NH$_2$), secondary amine (—NH—) and combinations thereof. An amine curing agent can have at least two primary amine groups. In some non-limiting embodiments, the amino groups are all primary groups. A polyamine curing agent can be a blocked, moisture-activated curing agent such as, for example, Vestamin® A-139. The equivalent ratio of isocyanate to amine in a curable composition can be, for example, from 1.0 to 0.6 from 1.0 to 0.7 from 1.0 to 0.8, from 1.0 to 0.9. A curable composition can have, for example an 10% excess of isocyanate to amine groups, an excess of 15%, an excess of 20%, and excess of 25%, or an excess of 30% isocyanate to amine groups.

Compositions such as sprayable coatings provided by the present disclosure can comprise an isocyanate-terminated polyurethane prepolymer provided by the present disclosure and a polyol curing agent.

Due to the presence of non-linear short chain diols in the polyurethane prepolymer backbone, hydrogen bonding and covalent cross-linking in the cured polymer network is reduced. This can result in a lower hard segment domain content in the cured polymer network and a higher thermodynamic stability of the soft segment and therefore, improved interaction with substrates.

Fillers can be added to a coating composition, for example, to improve the physical properties of a cured coating, to reduce the weight of a cured coating, and/or to impart electrical conductivity to the coating.

In can be desirable to reduce the specific gravity of a coating, for example, to reduce weight. Low specific coatings can be produced by adding low density filler particles to the curable coating composition. Reducing the hard segment domain content of the cured polymeric composition can facilitate homogeneous dispersion of filler particles, as well as other formulation components such as pigment, through the cured polymer matrix. Due to the low covalent cross-linking and hydrogen bonding resulting from incorporation of non-linear short chain diols in the polyurethane backbone, high filler content can be achieved while maintaining acceptable properties of the cured coating such as tensile strength and elongation before and following immersion in aviation fluid. It is believed that the high hard segment content of the cured polymeric composition partitions the soft segment content of the polyurethane prepolymers toward the surface of the composition and to interfaces, which can result in improved adhesion to filler particles as well as to a substrate.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Examples of electrically non-conductive fillers include materials such as, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and combinations of any of the foregoing. A composition can include 5 wt % to 60 wt % of a filler or combination of fillers, 10 wt % to 50 wt %, or from 20 wt % to 40 wt %, based on the total weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can comprise, for example, greater that 20 wt %, greater than 30 wt %, greater than 40 wt %, greater than 50 wt %, greater than 60 wt % or greater than 70 wt % of a filler such as an inorganic filler and/or an electrically conductive filler, where wt % is based on the wt % of the composition.

Compositions provided by the present disclosure can comprise, for example, from 20 wt % to 80 wt % of a filler, from 20 wt % to 70 wt %, from 30 wt % to 70 wt %, from 40 wt % to 70 wt % or from 50 wt % to 70 wt % of a filler such as an inorganic and/or electrically conductive filler, where wt % is based on the wt % of the composition.

Compositions provided by the present disclosure can include low density filler particles. Low density or lightweight particles refer to particles that have a specific gravity of no more than 0.7, no more than 0.25, or no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839, which is incorporated by reference in its entirety. Suitable lightweight fillers are also disclosed in U.S. Pat. No. 6,525,168. A light weight filler can comprise polyphenylene sulfide such as disclosed in U.S. Application Publication No. 2016/0257819, which is incorporated by reference in its entirety.

A composition can comprise less than 2 wt % of lightweight particles, less than 1.5 wt %, less than 1.0 wt %, less than 0.8 wt %, less than 0.75 wt %, less than 0.7 wt %, or less than 0.5 wt % of a composition, where wt % is based on the total weight of the composition.

A composition provided by the present disclosure can comprise light weight fillers that reduce the specific gravity of the composition. For example, a composition can have a specific gravity from 0.8 to 1, 0.7 to 0.9, from 0.75 to 0.85, from 0.9 to 1.2, from 1.0 to 1.2, or about 0.8 or about 1.1. A composition can have a specific gravity from 1.02 to 1.22, from 1.04 to 1.20, from 1.06 to 1.18, from 1.08 to 1.16, from 1.10 to 1.14, or from 1.11 to 1.13. The specific gravity of a composition can be less than about 1.2, less than about 1.1, less than about 1.0, less than about 0.9, less than about 0.8, less than about 0.75, less than about 0.7, less than about 0.65, less than about 0.6, or less than about 0.55. Specific gravity refers to the ratio of the density of a substance to the density of water at room temperature and pressure. Density can be measured according to ASTM D 792 Method A.

A composition provided by the present disclosure can comprise an electrically conductive filler. Electrical conductivity and EMI/RFI shielding effectiveness can be imparted to a composition by incorporating conductive materials. The conductive elements can include, for example, metal or metal-plated particles, fabrics, meshes, fibers, and combinations thereof. The metal can be in the form of, for example, filaments, particles, flakes, or spheres. Examples of suitable metals include copper, nickel, silver, aluminum, tin, and steel. Other conductive materials that can be used to impart EMI/RFI shielding effectiveness to cured polymer compositions include conductive particles or fibers comprising carbon or graphite.

Electrically conductive fillers also include high band gap materials such as zinc sulfide and inorganic barium compounds.

Fillers used to impart electrical conductivity and EMI/RFI shielding effectiveness to cured polymer compositions are well known in the art. Examples of electrically conductive fillers further include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to sealant compositions. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 30MF (Zoltek Companies, Inc.), a 0.921 µm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 µm to 250 µm, from 0.25 µm to 75 µm, or from 0.25 µm to 60 µm. Compositions of the present disclosure can comprise Ketjenblack® EC-600 JD (Akzo Nobel, Inc.), an electrically conductive carbon black characterized by an iodine absorption of 1000 mg/g to 11500 mg/g (JO/84-5 test method), and a pore volume of 480 $cm^3$/100 gm to 510 $cm^3$/100 gm (DBP absorption, KTM 81-3504). An electrically conductive carbon black filler can comprise Black Pearls® 2000 (Cabot Corporation).

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles and/or flakes. The amount and type of electrically conductive filler can be selected to produce a sealant composition which, when cured, exhibits a sheet resistance (four-point resistance) of less than 0.50 Ω/$cm^2$, or a sheet resistance less than 0.15 Ω/$cm^2$. The amount and type of filler can also be selected to provide effective EMI/RFI shielding over a frequency range from 1 MHz to 18 GHz.

Galvanic corrosion of dissimilar metal surfaces and the conductive compositions of the present disclosure can be minimized or prevented by adding corrosion inhibitors to the composition, and/or by selecting appropriate conductive fillers. The non-chromate corrosion inhibitors provided by the present disclosure can increase the corrosion resistance of sealants comprising an electrically conductive filler U.S. Pat. Nos. 5,284,888 and 5,270,364 disclose the use of aromatic triazoles to inhibit corrosion of aluminum and steel surfaces that can also be included in a sealant composition provided by the present disclosure. A sacrificial oxygen scavenger such as Zn can be used as a corrosion inhibitor. A corrosion inhibitor can comprise less than 10% by weight of the total weight of the electrically conductive composition. A corrosion inhibitor can comprise an amount ranging from 2 wt % to 8 wt % of the total weight of the electrically conductive composition. Corrosion between dissimilar metal surfaces can also be minimized or prevented by the selection of the type, amount, and properties of the conductive fillers comprising the composition.

A composition provided by the present disclosure can comprise additives such UV-absorbers, stabilizers, antioxidants, flow control agents, solvents, or combinations of any of the foregoing. Polyurethane polymers can be susceptible to degradation caused by thermos-oxidative, thermal, or photo-initiated degradation, the effects of which may be reduced or mitigated by a UV-absorber, or a stabilizer. Development of undesirable discoloration and reduction in mechanical properties can result from oxidative degradation of polyurethane polymers. In thermooxidation, the urethane group is relatively stable and the degradation starts at the polyether chain, for example, at the $CH_2$ group adjacent to or at the a position relative to the central linkage (e.g., the carbamate linkage). In aromatic-based polyurethanes, such as polyurethanes incorporating methylene diphenyl diisocyanate, the methylene bridge between the two aromatic rings of the methylene diphenyl diisocyanate is also a point of photooxidative attack. Oxidation of the polyurethane polymer may lead to a highly discolored and degraded polymer unless stabilizers are used.

Stabilizers can be added to the raw materials used to make the polyurethane polymer and/or stabilizers can be added as separate additives during the production of the polyurethane polymer. Stabilizers can include a reactive functional group, such as a hydroxyl group, to react with and chemically bond the stabilizers to the polyurethane polymer. The stabilizers do not include a reactive functional group and/or do not react with and bond to the composition. The stabilizers can be added to reduce or retard the effect of thermooxidation of either the raw materials or the finished polyurethane polymer. For example, aliphatic-based polyurethane polymers are typically light-stable, but stabilizers may be necessary to reduce or retard the loss of mechanical properties. Examples of the stabilizers include Irgaonox® antioxidants (BASF) and hindered amine light stabilizers (HALS).

UV-absorbers can be based upon any suitable UV-absorber. UV-absorbers can reduce or retard the effect of photo-oxidation by absorbing UV light that would otherwise result in the production of free radicals by breaking chemical bonds of other components of the composition. The UV-absorbers can include a reactive functional group, such as a hydroxyl group, to react with and chemically bond the UV-absorbers to the composition (e.g., the polyurethane polymer). In some embodiments, the UV-absorbers do not include a reactive functional group and/or do not react with and bond to the composition. Examples of the UV-absorber include any of the Tinuvin® UV-absorbers (Ciba Specialty Chemicals Corporation).

Compositions provided by the present disclosure may be used in two-component solvent based sprayable systems such as use as topcoats. A sprayable system can be provided as two parts, Part A and Part B, which can be combined and mixed before or during use.

A composition can comprise an isocyanate-terminated polyurethane prepolymer provided by the present disclosure and a polyol or polyamine curing agent.

A Part A mixture and Part B mixture may be mixed to achieve a ratio of reactive isocyanate groups to reactive hydroxyl groups, i.e., an NCO/OH ratio, from 1.5 to 0.5, from 1.5 to 1, from 1.4 to 1.1, or from 1.4 to 1.2, such as for example, an NCO/OH ratio of 1.3.

A Part A mixture and Part B mixture may be mixed to achieve a ratio of reactive isocyanate groups to reactive amine groups, i.e., an $NCO/NH_2$ ratio, from 1.5 to 0.5, such as for example, an $NCO/NH_2$ ratio from 1.2 to 0.7, from 1.1 to 0.8, or from 1.0 to 0.8.

The Part A mixture can include, for example, a polyurethane prepolymer. The Part A mixture can further include a solvent and one or more of the additives, such as the fillers, UV absorbers, flow aids, and rheology control agents, and catalysts for the curing reaction.

The Part B mixture can include a curing agent such as a polyol or a polyamine. The curing component can further include additives such as cure accelerators, cure retardants, plasticizers, additives, and/or fillers.

The coating composition including the Part A and Part B mixtures prior to complete drying and curing may have a solids content of 50% to 90% and a Brookfield viscosity of 60 cPs to 120 cPs. The coating composition can have a viscosity when mixed suitable for spray application. For example, a coating composition prior to complete drying and curing may have a solids content of 50% to 70% and a Brookfield viscosity of 60 cPs to 80 cPs. After the Part A and Part B mixtures are combined, the coating composition can be coated onto the substrate. The coating process may be any suitable process such as die-coating, spraying, brushing, dipping, rolling, flow-coating, or the like. For example, a coating process may be a continuous coating process or a batch coating process. In a continuous coating process, such as a continuous flow-coating process, the rate of mixing the Part A and Part B components, and the rate of coating the resulting coating composition can be controlled, for example, through metering, so that the viscosity of the coating composition remains within 80 cPs to 120 cPs.

Coating compositions of the present invention may be applied to any suitable dry film thickness. For example, a coating composition may be applied to a dry film thickness of 1 mil to 50 mils, from 1 mil to 40 mils, from 1 mil to 20 mils, or from 1 mil to 10 mils.

Clarity and transparency of coatings provided by the present disclosure can be assessed by measuring the haze of a coating. Haze values of 5 or less can be considered acceptable for clear coats and transparencies. Haze can be defined as the percentage of light that when passing through a film deviates from the incident beam by greater than 2.5.

Haze and luminous transmittance test can be determined according to, for example, ASTM D1003 or ASTM D4449 using a Haze-Gard Plus instrument (BYK Gardner).

Cured polyurethane films prepared from a composition provided by the present disclosure can exhibit a haze less than 2.5, a tensile strength from 2,500 psi to 9,000 psi determined according to ASTM D-412C, and a percent elongation from 200% to 500%, for a hard segment content greater than 50 wt % determined according to ASTM D-412C.

Cured polyurethane films prepared from a composition provided by the present disclosure having a ratio of rigid diisocyanate to flexible diisocyanate from 40:60 to 80:20 can exhibit a haze less than 2.5, a tensile strength from 2,500 psi to 6,000 psi, and a percent elongation from 200% to 400%, for a hard segment content greater than 50 wt %.

Cured polyurethane films prepared from a composition provided by the present disclosure having less than 2 wt % of a polyol cross-linker can exhibit a haze less than 2.5, a tensile strength from 4,000 psi to 9,000 psi, and a percent elongation from 200% to 400%, for a hard segment content greater than 50 wt %.

Cured polyurethane films prepared from a composition provided by the present disclosure having from 5 wt % to 20 wt % of a non-linear short chain cross-linker can exhibit a haze less than 2.5, a tensile strength from 4,000 psi to 7,000 psi, and a percent elongation from 200% to 500%, for a hard segment content greater than 50 wt %.

Cured polyurethane films prepared from a composition provided by the present disclosure having a hard segment content greater than 50 wt % can exhibit a tensile strength from 3,000 psi to 6,000 psi, and a percent elongation from 300% to 400%.

Cured polyurethane films prepared from a composition provided by the present disclosure having a hard segment content greater than 50 wt % and a filler content up to 65 wt % can exhibit a tensile strength from 2,000 psi to 3,500 psi, and a percent elongation from 50% to 200%.

Cured polyurethane films can have a thickness, for example, from 1 mil to 100 mils, from 5 mils to 90 mils, from 10 mils to 80 miles, from 20 mils to 70 mils, or from 30 mils to 60 mils. A cured polyurethane film can have a tensile strength of at least 1500 psi and an % elongation of at least 120 or at least 150 determined according to ASTM D-412C.

For coating applications, for an un-filled coating, it can be desirable that the tensile strength be greater than 3,000 psi, and the % elongation be greater than 400%. For a filled coating, it can be desirable that the tensile strength be greater than 1,500 psi, and the % elongation be greater than 70%.

ASPECTS OF THE INVENTION

1. A polyurethane prepolymer comprising a reaction product of reactants comprising: a polymeric diol (a); and a soft diisocyanate (b), or a non-linear short chain diol (c), or a combination of (b) and (c); wherein the non-linear short chain diol comprises: (c1) a short chain branched diol; (c2) a cyclic diol; or (c3) a combination thereof.

2. The polyurethane prepolymer of aspect 1, wherein the polyurethane prepolymer comprises an isocyanate-terminated polyurethane prepolymer.

3. The polyurethane prepolymer of any one of aspects 1 to 2, wherein the polymeric diol (a) comprises a polyether diol, wherein the polyether diol is characterized by a weight average molecular weight of less than 2,900 Daltons.

4. The polyurethane prepolymer of any one of aspects 1 to 3, wherein the polymeric diol (a) comprises a polyether diol, wherein the polyether diol is characterized by a weight average molecular weight from 300 Daltons to 2,700 Daltons.

5. The polyurethane prepolymer of any one of aspects 1 to 4, wherein the polyurethane prepolymer is liquid at 25° C. and 100 kPa.

6. The polyurethane prepolymer of any one of aspects 1 to 5, wherein the polyurethane prepolymer comprises a hard segment content of at least 30 wt %, wherein wt % is based on the total weight of the polyurethane prepolymer.

7. The polyurethane prepolymer of any one of aspects 1 to 6, wherein the polyurethane prepolymer comprises a hard segment content of at least 50 wt %, wherein wt % is based on the total weight of the polyurethane prepolymer.

8. The polyurethane prepolymer of any one of aspects 1 to 7, wherein the soft diisocyanate (b) comprises a 1,6-hexamethylene diisocyanate, 1,5-diisocyanato-2-methyl-pentane, 1,6-diisocyanato-2,2,4-trimethylhexane, 1,6-diisocyanato-2,4,4-trimethylhexane, 1,4-diisocyanatobutanone, tri-methyl-hexamethylene diisocyanate, 1,8-diisocyanatooctane, 1,12-diisocyanatododecane, 1,8-diiscyanto-2,4-dimethyloctane, TMXDI, isophorone diisocyanate (IPDI), 1,3-bis(isocyanato methyl)cyclohexane, 1,4-bis(isocyanato methyl)cyclohexane, trans-1,4-cyclohexylene diisocyanate, or 2,4-diisocyanato-1-methyl cyclohexane.

9. The polyurethane prepolymer of any one of aspects 1 to 8, wherein the polymeric diol (a) comprises a polyester diol, a polyether diol, a polycarbonate diol, a polycaprolactone diol, a polycarbonate/polyester diol, a dimer acid-based polyester diol, or a combination of any of the foregoing.

10. The polyurethane prepolymer of aspect 9, wherein the polyether diol is characterized by a weight average molecular weight of less than 2,900 Daltons.

11. The polyurethane prepolymer of aspect 9, wherein the polyether diol is characterized by a weight average molecular weight from 300 Daltons to 2,700 Daltons.

12. The polyurethane prepolymer of any one of aspects 1 to 11, wherein the polymeric diol (a) comprises a polyester diol, a polyether diol, or a combination thereof.

13. The polyurethane prepolymer of aspect 12, wherein the polyether diol is characterized by a weight average molecular weight of less than 2,900 Daltons.

14. The polyurethane prepolymer of aspect 12, wherein the polyether diol has a weight average molecular weight from 300 Daltons to 2,700 Daltons.

15. The polyurethane prepolymer of any one of aspects 1 to 14, wherein the polymeric diol (a) comprises a polyether diol having the structure of Formula (2):

$$HO-(-(CH_2)_mO-)_n-H \quad (2)$$

wherein, m is an integer from 1 to 10; and n is an integer from 4 to 50.

16. The polyurethane prepolymer of aspect 15, wherein n is an integer from 5 to 45

17. The polyurethane prepolymer of any one of aspect 15, wherein m is 4; and n is an integer from 4 to 45.

18. The polyurethane prepolymer of any one of aspects 1 to 17, wherein the non-linear short chain diol (c) comprises a branched short chain diol (c1).

19. The polyurethane prepolymer of any one of aspects 1 to 18, wherein the non-linear short chain diol (c) comprises a cyclic diol (c2).

20. The polyurethane prepolymer of any one of aspects 1 to 19, wherein the branched short chain diol (c1) comprises a branched chain alkane diol, wherein the branched chain alkane diol comprises: a backbone having from 2 to 10 carbon atoms; and a pendent group bonded to the backbone, wherein the pendent group comprises from 1 to 4 carbon atoms.

21. The polyurethane prepolymer of any one of aspects 1 to 20, wherein the branched short chain diol (c1) comprises a branched chain alkane diol having the structure of Formula (1):

$$HO-(-CH(-R^1)-)_n-OH \quad (1)$$

wherein, n is an integer from 2 to 10; ach $R^1$ is independently hydrogen or $C_{1-4}$ alkyl; and at least one $R^1$ is $C_{1-4}$ alkyl.

22. The polyurethane prepolymer of any one of aspects 1 to 21, wherein the non-linear short chain diol (c) is characterized by a molecular weight less than 500 Daltons.

23. The polyurethane prepolymer of any one of aspects 1 to 22, wherein the non-linear short chain diol (c) is characterized by a molecular weight from 100 Daltons to 500 Daltons.

24. The polyurethane prepolymer of any one of aspects 1 to 23, wherein the reactants further comprise: (d) a rigid diisocyanate; (e) a linear short chain diol; or (f) a combination thereof.

25. The polyurethane prepolymer of aspect 24, wherein the rigid diisocyanate (d) comprises 4,4-methylene dicyclohexyl diisocyanate or bis(4-isocyanatocyclohexyl) methane.

26. The polyurethane prepolymer of any one of aspects 24 to 25, wherein the reactants further comprise a linear short chain diol (e).

27. The polyurethane prepolymer of any one of aspects 24 to 26, wherein the linear short chain diol (e) is characterized by a molecular weight less than 500 Daltons.

28. The polyurethane prepolymer of any one of aspects 24 to 26, wherein the linear short chain diol (e) is characterized by a molecular weight from 100 Daltons to 500 Daltons.

29. The polyurethane prepolymer of any one of aspects 1 to 28, wherein the reactants further comprise a polyol polyfunctionalizing agent (g) comprising 3 to 6 terminal groups reactive with an isocyanate group.

30. The polyurethane prepolymer of aspect 29, wherein the polyol polyfunctionalizing agent (g) comprises a polyol having a hydroxyl functionality from 3 to 6.

31. The polyurethane prepolymer of aspect 29, wherein the polyol polyfunctionalizing agent (g) comprises an alkane polyol, an alkoxylated derivate of an alkane polyol, a cycloalkene polyol, an aromatic polyol or combination of any of the foregoing.

32. The polyurethane prepolymer of any one of aspects 1 to 31, wherein the polyurethane prepolymer comprises a hard segment content from 30 wt % to 80 wt %, where wt % is based on the total weight of the polyurethane prepolymer.

33. A polyurethane prepolymer comprising an isocyanate-terminated polyurethane prepolymer of Formula (3a), an isocyanate-terminated polyurethane prepolymer of Formula (3b), or a combination thereof;

$$O=C=N-R^1-[-NH-C(O)-O-A-O-C(O)-NH-R^1-]_n-N=C=O \quad (3a)$$

$$\{O=C=N-R^1-[-NH-C(O)-O-A-O-C(O)-NH-R^1-]_n-NH-C(O)-O-V'-\}_zB \quad (3b)$$

wherein, n is an integer from 1 to 60;

each $R^1$ comprises a divalent moiety derived from a diisocyanate;

each A independently comprises a divalent moiety derived from:

(a) a polymeric diol;

(c) a non-linear short chain diol, wherein the non-linear short chain diol comprises a branched short chain diol, a cyclic diol, or a combination thereof; or (e) a linear short chain diol;
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group,
wherein at least one A is derived from the non-linear short chain diol; or at least one R$^1$ is derived from a soft diisocyanate.

34. A polyurethane prepolymer comprising an isocyanate-terminated polyurethane prepolymer of Formula (3a), an isocyanate-terminated polyurethane prepolymer of Formula (3b), or a combination thereof:

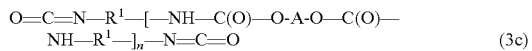

$$O=C=N—R^1—[—NH—C(O)—O-A-O—C(O)— NH—R^1—]_n—N=C=O \quad (3c)$$

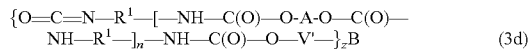

$$\{O=C=N—R^1—[—NH—C(O)—O-A-O—C(O)— NH—R^1—]_n—NH—C(O)—O—V'—\}_zB \quad (3d)$$

wherein,
n is an integer from 1 to 60;
each R$^1$ comprises a divalent moiety derived from a diisocyanate;
each A independently comprises a divalent moiety derived from:
(a) polymeric diol;
(c) a non-linear short chain diol; and
(e) a linear short chain diol; and
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group,
wherein at least one A is derived from the non-linear short chain diol (c).

35. A polyurethane prepolymer comprising an isocyanate-terminated polyurethane prepolymer of Formula (3a), an isocyanate-terminated polyurethane prepolymer of Formula (3b), or a combination thereof:

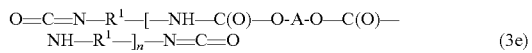

$$O=C=N—R^1—[—NH—C(O)—O-A-O—C(O)— NH—R^1—]_n—N=C=O \quad (3e)$$

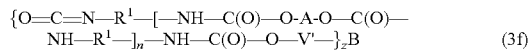

$$\{O=C=N—R^1—[—NH—C(O)—O-A-O—C(O)— NH—R^1—]_n—NH—C(O)—O—V'—\}_zB \quad (3f)$$

wherein,
n is an integer from 1 to 60;
each R$^1$ independently comprises a divalent moiety derived from a soft diisocyanate or a moiety derived from a rigid diisocyanate, wherein at least one R$^1$ is derived from a soft diisocyanate;
each A independently comprises a divalent moiety derived from:
(a) polymeric diol; and
(e) a linear short chain diol; and
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group,
wherein at least one A is derived from the non-linear short chain diol (c).

36. The polyurethane prepolymer of aspect 35, wherein the soft/flexible diisocyanates include 1,6-hexamethylene diisocyanate, 1,5-diisocyanato-2-methylpentane, 1,6-diisocyanato-2,2,4-trimethylhexane, 1,6-diisocyanato-2,4,4-trimethylhexane, 1,4-diisocyanatobutanone, tri-methyl-hexamethylene diisocyanate, 1,8-diisocyanatooctane, 1,12-diisocyanatododecane, 1,8-diiscyanto-2,4-dimethyloctane, or TMXDI.

37. The polyurethane prepolymer of aspect 35, wherein soft/flexible diisocyanate comprises isophorone diisocyanate (IPDI), 1,3-bis(isocyanato methyl)cyclohexane, 1,4-bis (isocyanato methyl)cyclohexane, trans-1,4-cyclohexylene diisocyanate, or 2,4-diisocyanato-1-methyl cyclohexane.

38. The polyurethane prepolymer of aspect 35, wherein the rigid diisocyanate comprises 4,4-methylene dicyclohexyl diisocyanate or bis(4-isocyanatocyclohexyl methane.

39. The polyurethane prepolymer of any one of aspects 33 to 38, wherein the polyurethane prepolymer comprises an isocyanate-terminated polyurethane prepolymer.

40. The polyurethane prepolymer of any one of aspects 33 to 38, wherein the polymeric diol (a) comprises a polyether diol, wherein the polyether diol is characterized by a weight average molecular weight of less than 2,900 Daltons.

41. The polyurethane prepolymer of any one of aspects 33 to 38, wherein the polymeric diol (a) comprises a polyether diol, wherein the polyether diol is characterized by a weight average molecular weight from 300 Daltons to 2,700 Daltons.

42. The polyurethane prepolymer of any one of aspects 33 to 38, wherein the polyurethane prepolymer is liquid at 25° C. and 100 kPa.

43. The polyurethane prepolymer of any one of aspects 33 to 38, wherein the polyurethane prepolymer comprises a hard segment content of at least 30 wt %, wherein wt % is based on the total weight of the polyurethane prepolymer.

44. The polyurethane prepolymer of any one of aspects 33 to 38, wherein the polyurethane prepolymer comprises a hard segment content of at least 50 wt %, wherein wt % is based on the total weight of the polyurethane prepolymer.

45. The polyurethane prepolymer of any one of aspects 33 to 38, wherein the polyurethane prepolymer comprises a hard segment content from 30 wt % to 80 wt %, where wt % is based on the total weight of the polyurethane prepolymer.

46. The polyurethane prepolymer of any one of aspects 33 to 38, wherein the polymeric diol is defined as in any of aspects 10 to 18.

47. The polyurethane prepolymer of any one of aspects 33 to 38, wherein the non-linear short chain diol is defined as in any of aspects 19 to 24.

48. The polyurethane prepolymer of any one of aspects 33 to 38, wherein the polyol polyfunctionalizing agent B(—V)$_z$ is defined as in any of aspects 28 to 30.

49. The polyurethane prepolymer of any one of aspects 34-38, wherein from the linear short chain diol is defined as in any of aspects 26 to 27.

50. A composition comprising the polyurethane prepolymer of any one of aspects 1, 33, 34, and 35.

51. The composition of aspect 50, comprising from 20 wt % to 80 wt % of a filler.

52. The composition of any one of aspects 50 to 51, wherein the filler comprises an electrically conductive filler.

53. The composition of any one of aspects 50 to 52, further comprising a polyamine curing agent; and wherein the polyurethane prepolymer comprises an isocyanate-terminated polyurethane prepolymer.

54. The composition of any one of aspects 50 to 53, further comprising a polyol curing agent; and wherein the polyurethane prepolymer comprises an isocyanate-terminated polyurethane prepolymer.

55. A coating prepared from the composition of any one of aspects 50 to 54.

56. The coating of aspect 55, wherein the coating is characterized by a haze less than 2.

57. A part comprising a coating of aspect 55.

58. A method of coating a substrate comprising: applying the composition of any one of aspects 50 to 54 to at least a portion of a surface of a substrate; and curing the applied composition to provide a coated substrate.

EXAMPLES

Embodiments provided by the present disclosure are further illustrated by reference to the following examples, which describe the synthesis, properties, and uses of certain polyurethane prepolymers provided by the present disclosure and coatings prepared from polyurethane prepolymers. It will be apparent to those skilled in the art that many modifications, both to materials, and methods, may be practiced without departing from the scope of the disclosure.

Example 1

Isocyanate-Terminated Polyurethane/Polyester Prepolymer Incorporating a Non-Linear Short Chain Diol A polyester diol (405.08 g, Priplast® XL-101) with a weight average molecular weight of 2,000 was charged in a pre-warmed kettle. Methyl amyl ketone was added and mixed at a temperature from 50° C. to 60° C. (122° F. to 140° F.). A non-linear short chain diol with pendent methyl and/or ethyl groups (4.26 g, 2,4-diethyl-1,5-pentanediol), a polyol with a functionality of four (4) (5 wt %, CAPA™ 4101, Perstrop) having a molecular weight of 1,000, Perstorp) and a diisocyanate (190.0 g, $H_{12}$MDI, Desmodur® W) were sequentially added and mixed. The temperature was decreased to 50° C. (122° F.) and additional diisocyanate was added. With the mixture at 50° C. a dibutyl tin dilaurate catalyst was added and the temperature maintained at 70° C. for 90 min to 120 min. The NCO value of the product was determined by back-titration to be from 3.5% to 4.2% or from 6% to 7%. The volatile organic content (VOC) was less than 180 g/L.

Example 2

Isocyanate-Terminated Polyurethane/Polyether Prepolymer Incorporating a Non-Linear Short Chain Diol A polyether diol (396.22 g, Terathane®-2000, 0.2 moles) with a molecular weight of 2,000 was charged in a pre-warmed kettle. A non-linear short chain diol with pendent methyl and/or ethyl groups (4.11 g, 2,4-diethyl-1,5-pentanediol), a polyol with a functionality of four (4) (5 wt %, CAPA™ 4101, Perstorp Group) and a diisocyanate (199.72 g, $H_{12}$MDI, Desmodur® W) were sequentially added and mixed. The temperature was decreased to 50° C. (122° F.) and additional diisocyanate was added. With the mixture at 50° C., a dibutyl tin dilaurate catalyst was added and the temperature maintained at 70° C. for from 90 min to 120 min. The NCO value of the product was determined by back-titration to be between 3.5% to 4.2%. The volatile organic content (VOC) was less than 180 g/L.

Example 3

Isocyanate-Terminated Polycarbonate Prepolymer Incorporating a Non-Linear Short Chain Diol Polycarbonate diol (Desmophen® C 3200, 235 g; 0.248 equivalent), tetra-functional polyol (13.39 g; 0.0535 eq.; a CAPA® 4101), a non-linear short chain diol (2,4-diethyl-1, 5-pentanediol; 20.6 g; 0.2575 eq), and $H_{12}$MDI (174.52 g; Desmodur® W) were charged into a round bottom kettle. Under agitation, solvent (15 wt %) was added, and the mixture heated to 60° C. Di-butyl tin dilaurate catalyst was added and the reactants mixed at a temperature from 65° C. and 70° C. for 90 min to 120 min. The final NCO content was between 6% to 7%.

Example 4

Isocyanate-Terminated Polycarbonate/Polyester Prepolymer Incorporating a Non-Linear Short Chain Diol Polycarbonate/polyester diol (Desmophen® C 1200; 230 g; 0.2271 eq.), a tetra-functional polyol (12.8 g; 0.0511 equivalent; CAPA® 4101), a non-linear short chain diol (2,4-diethyl-1,5-pentanediol; 20.6 g; 0.2575 eq.), and $H_{12}$MDI (168.76 g; Desmodur® W) were charged into a round bottom kettle. Under agitation, solvent (15 wt %) was added and the mixture agitated and heated to 60° C. Di-butyl tin dilaurate catalyst was added and the mixture agitated at a temperature from 65° C. to 70° C. for 90 min to 120 min. The final NCO content was between 6% to 7%.

Example 5

Polyurea Coating

The polyurethane/polyester prepolymer of Example 1 was combined with a blocked, moisture sensitive amine (Vestamin® A 139, aldimine based on isobutyl aldehyde and isophorone diamine, Evonik Industries). The curable composition was sprayed onto the surface of a substrate at different thicknesses. The coatings cured within 5 days to 7 days at room temperature. The cured films were visually clear and flexible. The equivalent ratio of isocyanate to amine is typically from 1 to 0.8 or from 1 to 0.6.

The haze and transmittance of the films were measured using a BYK Haze-Gard Plus instrument.

Example 6

Haze for Polyurea Coatings Prepared from Polyurethane Prepolymers Incorporating Linear Short Chain Diols or Non-Linear Short Chain Diols Haze values for a polyurethane films formed by reacting a polyurethane prepolymer prepared by reacting a combination of Terathane®-2000 and Terathane®-650 as the polyether polyol, a combination of butane diol and ethylene glycol (BDO/EG) as the short chain diol, and dicyclohexylmethane-4,4'diisocyanate (Desmodur® W; $H_{12}$MDI) as the diisocyanate, with a polyamine, Vestamin® A 139, are shown in Table 1. The polyurethane prepolymer was prepared according to Example 2. As shown in Table 1, the haze value increases with hard segment content, where hard segment content is the sum of the wt % short chain diol and wt % diisocyanate.

Replacing the linear short chain diols with the branched short chain diol (non-linear diol) 2,4-diethyl-1,5-pentanediol reduced the haze value of a cured polyurethane film by over an order of magnitude for the same hard segment content.

TABLE 1

Effect of hard segment content on haze value of polyurethane films.

| | Polyether Diol | Short Chain Diol | Diisocyanate | Hard Segment Content (wt %) | Haze Value |
|---|---|---|---|---|---|
| Comparative Example 1 | T-2000/T-650[1] | BDO/EG | $H_{12}MDI$ | 35 | 57 |
| Comparative Example 2 | T-2000/T-650 | BDO/EG | $H_{12}MDI$ | 40 | 74 |
| Comparative Example 3 | T-2000/T-650 | BDO/EG | $H_{12}MDI$ | 45 | 91 |
| Comparative Example 4 | T-2000/T-650 | BDO/EG | $H_{12}MDI$ | 50 | 89 |
| Comparative Example 5 | T-2000/T-650 | BDO/EG | $H_{12}MDI$ | 53 | 96 |
| Inventive Example 1 | T-2000/T-650 | 2,4-diethyl-1,5-pentanediol | $H_{12}MDI$ | 35-39 | <5 |

The haze values for 40-mil thick cured polyurethane films are presented in Table 2. The polyurethanes were prepared according to Example 2 using Terathane®-1000 as the polyether polyol and Desmodur® W ($H_{12}MDI$) as the diisocyanate. A linear short chain diol such as butane diol or ethylene glycol, a short chain branched diol such as butyl-ethyl propane diol (BEPD) or a cyclic diol, cyclohexane di-methanol (CHDM), were used in various combinations. The wt % of the polyurethane constituents represent wt % based on the total weight of the polyurethane.

Polyurethane films prepared using only linear diols exhibited a haze value of 10 to 40 at a hard segment content of 45 wt %. When a short chain branched diol or a cyclic diol replaced some or all of the short chain linear diol in the polyurethane, haze values less than three (3) could be obtained with a hard segment content up to 73 wt %. The films comprising a cyclic diol (CHDM) exhibited an elongation between 300% and 320% and a tensile strength from 6,330 psi to 6,500 psi. The films comprising BEPD and having a hard segment content over 60 wt % exhibited an elongation between 250% and 450% and a tensile strength from 4,000 psi to 5,500 psi.

TABLE 2

Effect of short chain diol on haze value of polyurethane films.

| | Polyether Diol | Short Chain Diol | Diisocyanate | Hard Segment Content (wt %) | Haze Value | Tensile Strength (psi) | % Elongation |
|---|---|---|---|---|---|---|---|
| Comparative Example 6 | T-1000[4] | BDO/EGL[7, 8] 4.7 wt %/2.2 wt % | $H_{12}MDI$[5] | 45 | 2-4 | 5050 | 450 |
| Comparative Example 7 | T-1000 | BDO/EG | $H_{12}MDI$ | 45 | 10-80 | 4000-6000 | <450 |
| Comparative Example 8 | T-1000 | BDO/EG 5.7 wt %/2.6 wt % | $H_{12}MDI$ | 50 | 79.5 | 5025 | 449 |
| Comparative Example 9 | T-1000 | BDO/EG 3.3 wt %/3.3 wt % | $H_{12}MDI$ | 49 | 2.1 | 5175 | 800 |
| Comparative Example 10 | T-1000 | BDO/EG 3.8 wt %/3.8 wt % | $H_{12}MDI$ | 52.5 | 2.18 | 5553 | 482 |
| Comparative Example 11 | T-1000 | BDO/EG 6.4 wt %/2.9 wt % | $H_{12}MDI/IPDI$[1, 6] | 50 | 1.7 | 3330 | 319 |
| Comparative Example 12 | T-1000 | BDO/EG 7.0 wt %/3.2 wt % | $H_{12}MDI/IPDI$[1] | 54 | 1.25 | 3010 | 280 |
| Comparative Example 13 | T-1000 | BDO/EG 6.0 wt %/2.8 wt % | $H_{12}MDI/IPDI$[2] | 50 | 1.5 | 4145 | 310 |
| Comparative Example 14 | T-1000 | BDO/EG 6.8 wt %/3.1 wt % | $H_{12}MDI/IPDI$[2] | 54 | 1.04 | 3430 | 237 |
| Inventive Example 2 | T-1000 | CHDM[9] 14 wt % | $H_{12}MDI$ | 53 | 1.6 | 6080 | 253 |
| Inventive Example 3 | T-1000 | CHDM/EG[3] | $H_{12}MDI$ | 63 | 2.3 | 6500 | 320 |
| Inventive Example 4 | T-1000 | BEPD/EG | $H_{12}MDI$ | 58 | 2.0/3.3 | 4000 | 250 |
| Inventive Example 5 | T-1000 | BEPD/EG | $H_{12}MDI$ | 63 | 2.1 | 5105 | 411 |
| Inventive Example 6 | T-1000 | BEPD[10] | $H_{12}MDI$ | 73 | 1.7 | 4562 | 253 |

[1]$H_{12}MDI$/IPDI ratio 50:50
[2]$H_{12}MDI$/IPDI ratio 70:30
[3]6 wt % to 12 wt % CHDM
[4]T-1000 Terathane ®-1000
[5]$H_{12}MDI$ Dicyclohexylmethane-4,4'-diisocyanate (Desmodur ® W)
[6]IPDI Isophorone diisocyanate
[7]EG Ethylene glycol
[8]BDO Butane diol
[9]CHDM Cyclohexane di-methanol
[10]BEPD Butyl-ethyl propane diol

Example 7

Effect of Flexible Diisocyanate on Properties of a Polyurea Coating

Table 3 shows the effects of replacing a portion of a diisocyanate such as dicyclohexylmethane-4-4'-diisocyanate ($H_{12}$MDI, representing a hard or rigid diisocyanate) with a flexible or soft diisocyanate such as isophorone diisocyanate (IPDI).

A polyurethane prepolymer was prepared as in Example 2 by reacting a polyether polyol (Terathane® T-100), a combination of linear short chain diols (BDO and EG) and either $H_{12}$MDI or a combination of $H_{12}$MDI and IPDI. Thin films were prepared by combining the polyurethane prepolymer with a polyamine Vestamin® A-139.

$H_{12}$MDI is non-polar and has a symmetrical structure and therefore can facilitate hydrogen bonding. Replacing $H_{12}$MDI with IPDI, which due to steric effects can reduce hydrogen bonding and cross-linking. Replacing 20 wt % of the $H_{12}$MDI with IPDI reduced the haze from 88 to 15 for coatings having a similar hard segment content. Increasing the IPDI content further reduced the haze.

TABLE 3

Effect of diisocyanate and polymeric diol on haze value of polyurethane films.

| Polyether Diol | Linear Short Chain Diol | Diisocyanate | Hard Segment Content (wt %) | Haze Value | Tensile Strength (psi) | % Elongation |
|---|---|---|---|---|---|---|
| T-1000 | BDO/EG[5] | $H_{12}$MDI | 45 | 2-4 | 5050 | 450 |
| T-1000 | BDO/EG | $H_{12}$MDI | 50 | 88 | 7200 | 348 |
| T-1000 | BDO/EG | $H_{12}$MDI/IPDI[1] | 60 | 15 | 4900 | 304 |
| T-1000 | BDO/EG | $H_{12}$MDI/IPDI[2] | 50 | 1.7 | 3330 | 319 |
| T-1000 | BDO/EG | $H_{12}$MDI/IPDI[2] | 54 | 1.3 | 3000 | 280 |
| T-1000 | BDO/EG | $H_{12}$MDI/IPDI[3] | 50 | 1.5 | 4145 | 310 |
| T-1000 | BDO/EG | $H_{12}$MDI/IPDI[4] | 54 | 1.0 | 3430 | 237 |

[1] 20 wt % of $H_{12}$MDI was replaced with IPDI
[2] $H_{12}$MDI/IPDI ratio 50:50
[3] $H_{12}$MDI/IPDI ratio 70:30
[4] 20 wt % of the $H_{12}$MDI was replaced with IPDI.
[5] 5.2 wt % BDO/2.4 wt % EG.

Example 8

Comparison of Properties of a Polyurea Films

The haze value, tensile strength and % elongation of various polyurethane compositions containing a trifunctional caprolactone polyol (CAPA® 3031, mw 300) cross-linker are shown in Table 4. A polyurethane prepolymer was prepared by reacting a polyether polyol (Terathane®-1000) with from 0 to 1.6 wt % of a trifunctional caprolactone polyol (CAPA® 3031, mw 300), a combination of linear short chain diols (BDO and EG) or a cyclic short chain diol (CHDM), and a diisocyanate ($H_{12}$MDI) or a combination of diisocyanates ($H_{12}$MDI and IPDI). The relative amounts are shown in Table 4.

TABLE 4

Properties of cured films prepared using a trifunctional caprolactone polyol cross-linker.

| Polyether Diol | Short Chain Diol (wt %) | CAPA® 3031* Cross-linker (wt %) | Diisocyanate | Hard Segment Content (wt %) | Haze Value | Tensile Strength (psi) | % Elongation |
|---|---|---|---|---|---|---|---|
| T-1000 | BDO/EG 3.8 wt %/3.8 | 0 | $H_{12}$MDI | 53 | 2.0 | 5550 | 480 |

TABLE 4-continued

Properties of cured films prepared using a trifunctional caprolactone polyol cross-linker.

| Polyether Diol | Short Chain Diol (wt %) | CAPA® 3031* Cross-linker (wt %) | Diisocyanate | Hard Segment Content (wt %) | Haze Value | Tensile Strength (psi) | % Elongation |
|---|---|---|---|---|---|---|---|
| T-1000 | BDO/EG 8.6 wt %/2.8 wt % | 1.0 | $H_{12}$MDI/IPDI 1:1 | 61 | 2.9 | 4908 | 276 |
| T-1000 | BDO/EG 7.9 wt %/2.6 wt % | 1.5 | $H_{12}$MDI/IPDI 0.75:0.25 | 60 | 1.4 | 4702 | 302 |
| T-1000 | BDO/EG 4.0 wt %/4.0 wt % | 1.6 | $H_{12}$MDI/IPDI 0.80:0.20 | 55 | 2.3 | 6040 | 272 |
| T-1000 | BDO/EG 3.4 wt %/3.4 wt % | 1.4 | $H_{12}$MDI/IPDI 0.80:0.20 | 50 | 2.2 | 7935 | 308 |
| T-1000 | CHDM 11.9 wt % | 1.5 | $H_{12}$MDI | 50 | 2.0 | 5235 | 200 |
| T-1000 | CHDM 13.5 wt % | 1.4 | $H_{12}$MDI | 54 | 2.2 | 5243 | 223 |
| T-1000 | CHDM 13.6 wt % | 1.1 | $H_{12}$MDI | 53 | 2.1 | 4534 | 222 |

The results shown in Table 4 indicate that compositions having a cross-linker exhibit high tensile strength and % elongation. Polyurethane prepolymers prepared using either a soft diisocyanate (IPDI) or a non-linear short chain diol exhibit low haze for hard segment contents greater than 50 wt %.

Comparative Example 9

Isocyanate-Terminated Polyurethane/Polyether Prepolymer Incorporating a Linear Short Chain Diol Polyether diols (Terathane®-2000 or Terathane®-2900) were combined with butane diol (BDO) (linear short chain diol) and methyl amyl ketone to provide a hard segment content as low as 38 wt %. A diisocyanate (Desmodur® W, $H_{12}$MDI) was added and mixed. The mixture became hazy and turbid. Adding solvent did not improve the haziness and turbidity. The material solidified as a waxy solid upon cooling to room temperature.

Example 10

Properties of Filled Coating

Coatings were prepared as in Example 1 and/or Example 4. Polyurethane prepolymers were prepared using either Desmophen® C 3200 (polycarbonate diol) or Priplast® XL-101 (dimer acid-based polyester diol) as the polymeric diol, the non-linear short chain diol, 2,4-diethyl-1,5-pentanediol, and $H_{12}$MDI (Desmodur® W) as the diisocyanate. The polyurethane prepolymers had a hard segment content of 39 wt %.

The polyurethane prepolymers were combined with a moisture-reactive polyamine curing agent (Vestamin® A-139) and either 0 wt % or 65 wt % of a filler combination of electrically conductive fillers; density 58.3 lb/gal). The compositions were sprayed onto a surface to provide a 40-mil thick film and then cured for 7 days at room temperature. The tensile strength and % elongation of the cured films were determined according to ASTM D-412C and is presented in Table 5.

TABLE 5

Physical properties of filled polyurea coatings.

| Polymeric Polyol | Filler Content (wt %) | Tensile Strength (psi) | Elongation (%) |
|---|---|---|---|
| Desmophen® C 3200 Polycarbonate | 0 | 4466 | 357 |
| Desmophen® C 3200 Polycarbonate | 65 | 3182 | 92 |
| Priplast® XL-101 Dimer acid-based polyester | 0 | 5464 | 413 |
| Priplast® XL-101 Dimer acid-based polyester | 65 | 2212 | 158 |

The cured polyurea coatings exhibited acceptable tensile strength and % elongation even with a filler content of 65 wt %.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. An isocyanate-terminated polyurethane prepolymer comprising a one-step reaction product of reactants comprising:
   (a) a polymeric diol, wherein the polymeric diol comprises a polyether diol, a polycarbonate diol, or a combination thereof;
   (b) a diisocyanate comprising a rigid diisocyanate and a soft diisocyanate, wherein the diisocyanate comprises a wt % ratio of the rigid diisocyanate to the soft diisocyanate from 1:1 to 4:1; and
   (c) a linear short chain diol; and (d) a branched non-linear short chain diol, a cyclic diol, or a combination thereof;

wherein the isocyanate-terminated polyurethane prepolymer is liquid at 25° C. and 100 kPa;

wherein the isocyanate-terminated polyurethane prepolymer has a hard segment content from 50 wt % to 60 wt %;

wherein the hard segment content comprises moieties derived from the rigid diisocyanate; and wherein wt % is based on the total weight of the reactants.

2. The isocyanate-terminated polyurethane prepolymer of claim 1, wherein,
the rigid diisocyanate comprises 4,4'-methylene dicyclohexyl diisocyanate ($H_{12}MDI$);
the soft diisocyanate comprises isophorone diisocyanate (IPDI); and
the linear short chain diol comprises butane diol (BDO), ethylene glycol (EG), or a combination thereof.

3. The isocyanate-terminated polyurethane prepolymer of claim 1, wherein the reactants further comprise from 0.5 wt % to 2 wt % of a polyol polyfunctionalizing agent, wherein wt % is based on the total weight of the reactants.

4. The isocyanate-terminated polyurethane prepolymer of claim 3, wherein the polyol polyfunctionalizing agent comprises a caprolactone polyol.

5. An isocyanate-terminated polyurethane prepolymer having the structure of Formula (3e):

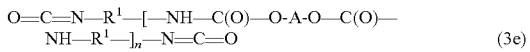

O=C=N—R$^1$—[—NH—C(O)—O-A-O—C(O)—NH—R$^1$—]$_n$—N=C=O    (3e)

wherein,
n is an integer from 10 to 60;
each R$^1$ is independently derived from a rigid diisocyanate and a soft diisocyanate, wherein a wt % ratio of moieties derived from the rigid diisocyanate and from the soft diisocyanate is from 1:1 to 4:1;
each A is independently derived from a polymeric diol and a linear short chain diol and at least one A is derived from a branched non-linear short chain diol, a cyclic diol, or a combination thereof;
the polymeric diol comprises a polyether diol, a polycarbonate diol, or a combination thereof;
the isocyanate-terminated polyurethane prepolymer comprises from 5 wt % to 15 wt % of the linear short chain diol;
the isocyanate-terminated polyurethane prepolymer comprises from 50 wt % to 60 wt % of moieties derived from the rigid diisocyanate and the linear short chain diol;
the isocyanate-terminated polyurethane prepolymer is liquid at 25° C. and 100 kPa; and
wt % is based on the total weight of the isocyanate-terminated polyurethane prepolymer.

6. The isocyanate-terminated polyurethane prepolymer of claim 5, wherein,
the rigid diisocyanate comprises 4,4'-methylene dicyclohexyl diisocyanate ($H_{12}MDI$);
the soft diisocyanate comprises isophorone diisocyanate (IPDI); and
the linear short chain diol comprises butane diol (BDO), ethylene glycol (EG), or a combination thereof.

7. The isocyanate-terminated polyurethane prepolymer of claim 5, further comprising an isocyanate-terminated polyurethane prepolymer of Formula (3f),

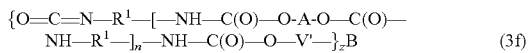

{O=C=N—R$^1$—[—NH—C(O)—O-A-O—C(O)—NH—R$^1$—]$_n$—NH—C(O)—O—V'—}$_z$B    (3f)

wherein,
B represents a core of a z-valent, polyfunctionalizing agent B(—V)$_z$ wherein,
z is an integer from 3 to 6; and
each V is a moiety comprising a terminal group reactive with an isocyanate group; and
each —V'— is derived from the reaction of —V with an isocyanate group.

8. The isocyanate-terminated polyurethane prepolymer of claim 7, wherein the polyfunctionalizing agent comprises a caprolactone polyol.

9. A composition comprising the isocyanate-terminated polyurethane prepolymer of claim 1.

10. The composition of claim 9, comprising from 20 wt % to 80 wt % of a filler, wherein wt % is based on the total weight of the composition.

11. A coating prepared from the composition of claim 9.

12. The coating of claim 11, wherein the coating is characterized by a haze less than 2.

13. A part comprising the coating of claim 11.

14. A method of coating a substrate comprising:
applying the composition of claim 9 to at least a portion of a surface of a substrate; and
curing the applied composition to provide a coated substrate.

15. The method of claim 14, wherein applying comprises spraying.

16. An isocyanate-terminated polyurethane prepolymer comprising a one-step reaction product of reactants comprising:
(a) a polymeric diol, wherein the polymeric diol comprises a polyether diol, a polycarbonate diol, or a combination thereof;
(b) a rigid diisocyanate; and
(c) a branched non-linear short chain diol, a cyclic diol, or a combination thereof;
wherein the isocyanate-terminated polyurethane prepolymer comprises:
from 11 wt % to 14 wt % of moieties derived from the branched non-linear short chain diol;
from 50 wt % to 75 wt % of a hard segment content, wherein the hard segment content comprises moieties derived from the rigid diisocyanate and moieties derived from a linear short chain diol;
wherein the isocyanate-terminated polyurethane prepolymer is liquid at 25° C. and 100 kPa; and
wherein wt % is based on the total weight of the reactants.

17. The isocyanate-terminated polyurethane prepolymer of claim 16, wherein,
the rigid diisocyanate comprises 4,4'-methylene dicyclohexyl diisocyanate ($H_{12}MDI$); and
the branched non-linear diol comprises butylethyl propane diol (BEPD).

18. The isocyanate-terminated polyurethane prepolymer of claim 16, wherein the reactants further comprise from 0.5 wt % to 2 wt % of a polyol polyfunctionalizing agent, wherein wt % is based on the total weight of the reactants.

19. The isocyanate-terminated polyurethane prepolymer of claim 18, wherein the polyol polyfunctionalizing agent comprises a caprolactone polyol.

20. An isocyanate-terminated polyurethane prepolymer comprising an isocyanate-terminated polyurethane having the structure of Formula (3e):

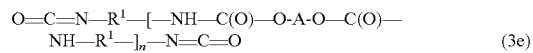

O=C=N—R$^1$—[—NH—C(O)—O-A-O—C(O)—NH—R$^1$—]$_n$—N=C=O    (3e)

wherein,
n is an integer from 10 to 60;
each $R^1$ is derived from a rigid diisocyanate;
each A is independently derived from a diol, wherein the diol is selected from a polymeric diol, a linear short chain diol, and a non-linear short chain diol comprising a branched non-linear short chain diol, a cyclic diol, or a combination thereof;
the polymeric diol comprises a polyether diol, a polycarbonate diol, or a combination thereof;
the isocyanate-terminated polyurethane prepolymer comprises from 50 wt % to 75 wt % of moieties derived from the rigid diisocyanate and the linear short chain diol;
wherein the non-linear short chain diol;
wherein the isocyanate-terminated polyurethane prepolymer comprises from 11 wt % to 14 wt % of the branched non-linear short chain diol; and
wt % is based on the total weight of the isocyanate-terminated polyurethane prepolymer.

21. The isocyanate-terminated polyurethane prepolymer of claim 20, wherein,
the rigid diisocyanate comprises 4,4'-methylene dicyclohexyl diisocyanate ($H_{12}$MDI); and
the branched non-linear diol comprises butylethyl propane diol (BEPD).

22. The isocyanate-terminated polyurethane prepolymer of claim 20, further comprising an isocyanate-terminated polyurethane prepolymer having the structure of Formula (3f):

$$\{O=C=N-R^1-[-NH-C(O)-O-A-O-C(O)-NH-R^1-]_n-NH-C(O)-O-V'-\}_zB \quad (3f)$$

wherein,
B represents a core of a z-valent, polyfunctionalizing agent B(—V)z wherein,
z is an integer from 3 to 6; and
each V is a moiety comprising a terminal group reactive with an isocyanate group; and
each —V'— is derived from the reaction of —V with an isocyanate group.

23. The isocyanate-terminated polyurethane prepolymer of claim 22, wherein the polyfunctionalizing agent comprises a caprolactone polyol.

24. A composition comprising the isocyanate-terminated prepolymer of claim 16.

25. A coating prepared from the composition of claim 24.

26. A part comprising the coating of claim 25.

27. A method of coating a substrate comprising:
applying the composition of claim 24 to at least a portion of a surface of a substrate; and
curing the applied composition to provide a coated substrate.

* * * * *